US008749572B2

(12) United States Patent
DiVerdi et al.

(10) Patent No.: US 8,749,572 B2
(45) Date of Patent: Jun. 10, 2014

(54) SYSTEM AND METHOD FOR SIMULATION OF BRUSH-BASED PAINTING IN A COLOR SPACE THAT INCLUDES A FILL CHANNEL

(75) Inventors: Stephen J. DiVerdi, San Francisco, CA (US); Aravind Krishnaswamy, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 476 days.

(21) Appl. No.: 12/790,606

(22) Filed: May 28, 2010

(65) Prior Publication Data

US 2013/0120433 A1    May 16, 2013

(51) Int. Cl.
    *G09G 5/02*    (2006.01)
(52) U.S. Cl.
    USPC ........... 345/592; 345/581; 345/582; 345/589; 345/591; 345/593; 358/1.9
(58) Field of Classification Search
    USPC ................. 345/581, 582, 589, 591, 592, 593; 358/1.9
    See application file for complete search history.

(56) References Cited

U.S. PATENT DOCUMENTS

| 5,420,607 | A  | * | 5/1995 | Miller et al. | 345/156 |
| 6,456,297 | B1 | * | 9/2002 | Wilensky | 345/619 |
| 8,237,710 | B1 | * | 8/2012 | Marketsmueller | 345/423 |
| 8,379,047 | B1 | * | 2/2013 | DiVerdi | 345/592 |
| 2002/0130908 | A1 | * | 9/2002 | Wilensky | 345/863 |
| 2002/0175925 | A1 | * | 11/2002 | Lie | 345/690 |
| 2007/0216684 | A1 |  | 9/2007 | Hsu |  |
| 2009/0310151 | A1 |  | 12/2009 | Nordback |  |
| 2013/0120324 | A1 | * | 5/2013 | DiVerdi et al. | 345/179 |

OTHER PUBLICATIONS

Evening; Martin; 2007; Adobe Photoshop CS3 for Photographers.*
Siu Hang Chu, "Making Digital Painting Organic," PhD thesis, Hong Kong University of Science and Technology, 2007.
Baxter B., Scheib V., Lin M., Manocha D.: Dab: Interactive haptic painting with 3d virtual brushes. In Proceedings of ACM SIGGRAPH (2001), pp. 461-468.
William Valentine Baxter III, "Physically-based Modeling Techniques for Interactive Digital Painting," PhD thesis, University of North Carolina, 2004.

* cited by examiner

*Primary Examiner* — Xiao Wu
*Assistant Examiner* — Todd Buttram
(74) *Attorney, Agent, or Firm* — Wolfe-SBMC

(57) ABSTRACT

Systems and methods for performing brush behavior simulation in an image editing application may facilitate realistic paint simulation by the addition of a fill channel to a color space representation that includes a set of color channels and an alpha channel representing opacity of the paint. The fill channel value for each pixel of a brush model or canvas may represent the amount of paint stored at the pixel. The system may include logic to support paint compositing, mixing, and depletion operations that calculate a consequent color of a destination pixel resulting from the operations dependent on the fill channel values for the source and/or destination pixels. The resulting color channel, opacity channel, and fill channel values may be converted to a color space that does not include a fill channel or opacity channel for display. A source pixel may be a pixel of an atomic element of a texture.

20 Claims, 13 Drawing Sheets

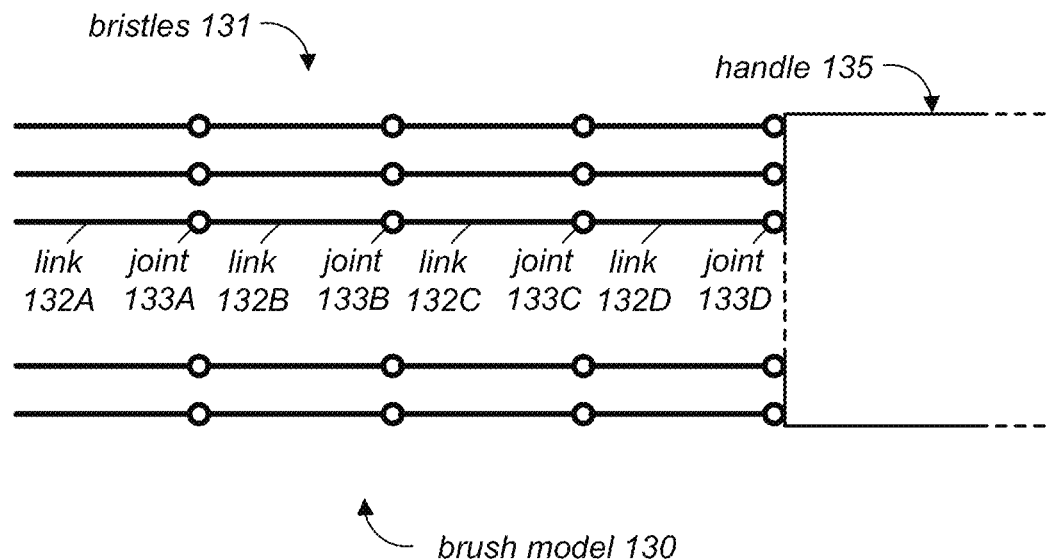
FIG. 3
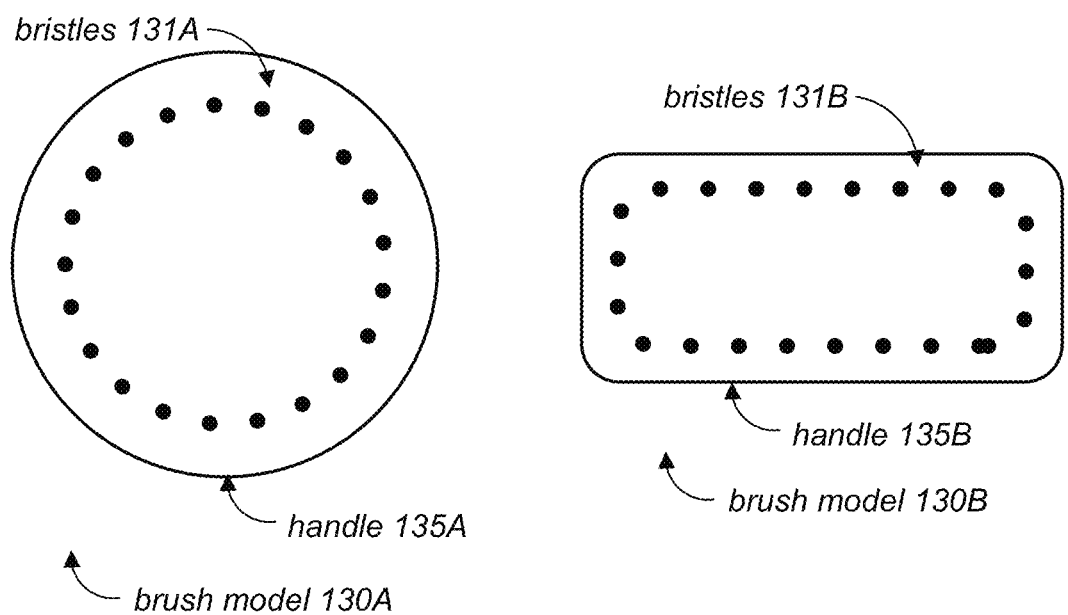
FIG. 4A
FIG. 4B

SYSTEM AND METHOD FOR SIMULATION OF BRUSH-BASED PAINTING IN A COLOR SPACE THAT INCLUDES A FILL CHANNEL

BACKGROUND

1. Field of the Disclosure

This disclosure relates generally to computer systems; and more particularly, it is directed to simulating brushes for deposition of paint or ink onto a virtual canvas using computer systems, and performing imaging editing operations using a color space representation that includes a fill channel.

2. Description of the Related Art

Digital image editing is the process of creating and/or modifying digital images using a computer system. Using specialized software programs, users may manipulate and transform images in a variety of ways. These digital image editors may include programs of differing complexity, such as limited-purpose programs associated with acquisition devices (e.g., digital cameras and scanners with bundled or built-in programs for managing brightness and contrast); limited editors suitable for relatively simple operations such as rotating and cropping images; and professional-grade programs with large and complex feature sets.

Digital images may include raster graphics, vector graphics, or a combination thereof. Raster graphics data (also referred to herein as bitmaps) may be stored and manipulated as a grid of individual picture elements called pixels. A bitmap may be characterized by its width and height in pixels and also by the number of bits per pixel. Commonly, a color bitmap defined in the RGB (red, green blue) color space may comprise between one and eight bits per pixel for each of the red, green, and blue channels. An alpha channel may be used to store additional data such as per-pixel transparency (or opacity) values.

An operation often provided by a digital image editor is the use of a virtual "paintbrush" (also referred to herein as a "brush" or a "brush tool") to modify a digital image by depositing virtual paint or virtual ink. Various prior approaches have attempted to model a real-world brush and its behavior in the context of such an operation. For example, a two-dimensional (2D) raster image may be created to represent the shape of the brush as it contacts the canvas, and the 2D image may be stamped repeatedly along the input path. In another approach, a vector representation of the brush tip has been used instead of a 2D raster image. In some systems, a brush tip is represented as a single triangle mesh.

Colors in the images in digital documents (and in image editing applications) are often represented in a color space such as RGB or CMYK. To these linear color channels, an alpha channel (A) is typically added to represent opacity. Previous work on pigment-based modeling of the effects of various editing operations on color was inspired by the Kubelka-Munk compositing equations. This previous work focused on physical modeling. In these approaches, an amount of pigment at each pixel (e.g., a density or concentration of one or more base pigments) is represented as part of the physics being simulated (e.g., in a fluid simulation), and complex rendering equations are used to determine the final color of each pixel. In these approaches, a pigment texture stores amounts of particular types of pigment, which are advected by respective fluid simulations. The final pigment amounts are turned into RGB values for rendering using the Kubelka-Munk compositing equations, which are fairly complicated and unintuitive.

Previous commercial digital painting applications do not address the issue of amounts of paint, and use standard RGBA compositing and mixing functions to determine the final color of each pixel following an image editing operation.

SUMMARY

The systems and methods described herein may be used to simulate the deposition and/or removal of natural media paints in an image editing application by applying logic about the physics of fluids. In the examples described herein, paint (e.g., on a brush or canvas) may be defined as the set of color channels and the alpha channel used in the canvas document format, where the alpha channel represents the opacity or transparency of the paint. To properly mimic the deposition behavior of various paints and to support the simulation of such behavior, the systems and methods described herein may employ an additional channel of data for each pixel of a brush model and/or canvas to represent the amount of paint stored in the unit volume of the canvas or brush in an image editing application. In order to take advantage the addition of the F channel in simulating realistic painting behaviors, the system and methods described herein may include additional logic to support blending, mixing, and compositing operations using this additional data.

In some embodiments, the systems and methods described herein for performing brush behavior simulation and image editing operations may allow for additional expressivity in realistic paint simulation by the extension of existing color models in digital painting applications in a way that does not significantly increase the complexity of the computations used in paint compositing and mixing operations. In addition, the addition of the fill channel may provide support for realistic paint depletion operations (e.g., for erasing or scraping away some, but not all, of the paint at the targeted pixels).

In some embodiments, the system and methods described herein may be used to determine the effect of each of a collection of bristle representations on an image throughout the motion of a brush stroke. In such embodiments, the image may be modified based on the determined effect of each of the plurality of bristle representations on the image.

In some embodiments, the inputs to an image editing operation (such as an operation that results in some amount of paint being composited over other paint, mixed with other paint, or removed from a canvas) may include a value that represents an amount of paint at a given pixel involved an image editing application. In various embodiments, such data may be provided for a given pixel that is a source pixel (i.e. to represent paint on brush tool used to apply an image editing operation) and/or for a given pixel that is a destination pixel (i.e. to represent paint at a pixel of a canvas to which the image editing application is applied). The data representing the amount of paint at the given pixel may be stored as a fill channel value in a data structure that also stores data representing one or more color channel values and an opacity channel value for the given pixel in a given color space (e.g., an RGBA or CMYKA color space). In some embodiments, the given pixel may be a pixel of an atomic element of a texture to be applied to the canvas by the image editing operation.

In response to receiving input specifying an image editing operation for which the given pixel is a source pixel or a destination pixel, the system may calculate the consequent color of the destination pixel as a result of the image editing operation, and this calculation may be dependent on the fill channel value of the given pixel. For example, the image editing operation may use an RGBAF or CMYKAF representation when calculating the effects of the image editing operation on the destination pixel. The system may then display the consequent color of the destination pixel in the image editing application (e.g., as a pixel of the modified image). In various embodiments, calculating the consequent color of the destination pixel may include calculating new values for one or more resultant color channel values, for a resultant opacity channel value, and/or for a resultant fill channel value for the destination pixel. For example, some image editing operations (e.g., a depletion operation) may modify the opacity and fill channel values for the destination pixel, but not the color channel values, while other image editing operations (e.g., compositing and mixing operations) may modify the opacity value, the fill channel value, and the color channel values for the destination pixel. In some embodiments, the fill channel value may be clamped to a maximum value of one while calculating the opacity value, fill channel value, and color channel values of the destination pixel in a color space that includes a fill channel value, but the full range of fill channel values may be stored for subsequent use.

Calculating the consequent color may also include converting the resultant color channel values, the resultant opacity channel value, and the resultant fill channel value for the destination pixel to one or more other color channel values representing the destination pixel in a color space that does not include an opacity channel value and that does not include a fill channel value (e.g., RGB or CMYK), and the conversion calculations may also be dependent on the resultant opacity channel value and the resultant fill channel value.

BRIEF DESCRIPTION OF THE DRAWINGS

FIG. 3 is a block diagram further illustrating a brush model, according to one embodiment.

FIGS. 4A and 4B are block diagrams illustrating examples of brush models, according to various embodiments.

Figure 1:
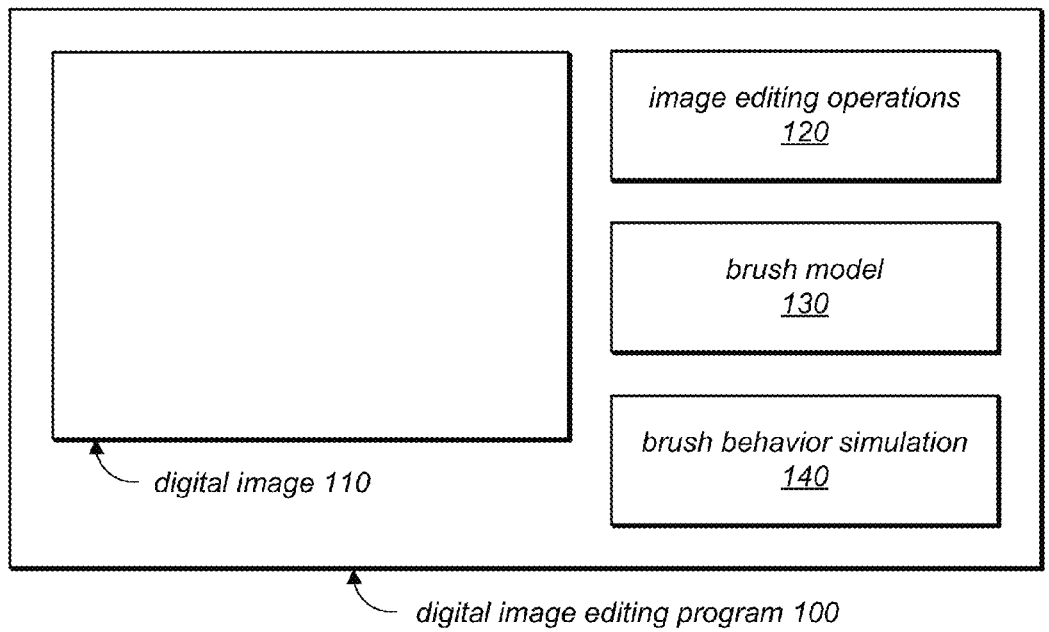
FIG. 1 is a block diagram illustrating one embodiment of a digital image editing program configured for the simulation of brushes.

The specific embodiments described herein and shown by way of example in the drawings are susceptible to various modifications and alternative forms. It should be understood, therefore, that drawings and detailed description thereto are not intended to be limited to the particular form disclosed, but on the contrary, the disclosure is to cover all modifications, equivalents and alternatives falling within the spirit and scope as defined by the appended claims.

DETAILED DESCRIPTION OF EMBODIMENTS

A realistic simulation of the deposition of natural media paints in an image editing application, such as those described herein, may apply logic about the physics of fluids. For example, one of the important behaviors of real paints is the pickup of wet paint off a canvas, dirtying the brush. In the examples described herein, paint (e.g., on a brush or canvas) may be defined as the set of color channels and the alpha channel used in the canvas document format, where the alpha channel represents the opacity or transparency of the paint. To properly mimic the deposition behavior of various paints and to support the simulation of such behavior, the systems and methods described herein may employ an additional channel of data for each pixel of a brush model and/or canvas. This additional channel may in various embodiments represent the amount of paint stored in the unit volume of the canvas or brush in an image editing application. As described in more detail below, in order to take advantage of the addition of the F channel in simulating realistic painting behaviors, the system and methods described herein may include additional logic to support blending, mixing, and compositing operations using this additional data.

In some embodiments, the systems and methods described herein for performing brush behavior simulation and image editing operations may allow for additional expressivity in realistic paint simulation by the extension of existing color models in digital painting applications in a way that does not significantly alter the complexity of the computations used in paint compositing and mixing. In addition, the addition of the fill channel may provide support for realistic paint depletion operations (e.g., for erasing or scraping away some, but not all, of the paint at the targeted pixels).

The description that follows includes a discussion of a brush stroke model representing a bristle brush, and physical simulations of bristle brushes, as well as descriptions of various embodiments of systems and methods for performing image editing operations in color space representation that includes a fill channel.

Using embodiments of the systems and methods described herein, realistic brush behavior may be simulated in a painting application. In one embodiment, the brush behavior may be simulated substantially in real-time to deposit ink or paint onto a virtual canvas. A brush model may include a large set of discrete bristles. The bristles may comprise "virtual" bristles and may also be referred to herein as bristle representations. The simulated behavior of the brush may result in continuous strokes created by sweeping individual bristles into quadrilaterals. The brush model and brush behavior simulation may model the change of the shape of a brush tip during a stroking motion and the deposition of paint or ink resulting from the motion. By computing the effect of each bristle independently of other bristles, a faithful reproduction of how a real brush deposits paint or ink and changes shape during a stroke may be achieved.

FIG. 1 is a block diagram illustrating an embodiment of a digital image editing program 100 configured for use with the brush simulation techniques described herein. A digital image editing program 100, also referred to herein as an image editor 100, may be used to create and/or modify a digital image 110, also referred to herein as an image 110. The digital image editing program 100 may comprise a plurality of editing operations 120. The editing operations 120 may comprise suitable operations for modifying elements of the image 110. For example, various effects such as filters (e.g., Gaussian blur, median filter, add noise, reduce noise, fragment, unsharp mask), image adjustments (e.g., levels, curves, brightness/contrast, shadow/highlight), and other operations (e.g., resizing, cropping, thresholding, rotation, perspective distortion) may be applied to one or more images, selections within the image 110, or other suitable data related to the image 110. In one embodiment, a suitable product such as Adobe Photoshop®, Adobe Illustrator®, or Adobe AfterEffects® (available from Adobe Systems, Inc.) may be used as the image editor 100.

Using the image editor 100, a user may seek to apply pixel values (also referred to herein as "paint" or "ink") such as pixel colors and alpha (e.g., transparency or opacity) values to the digital image 110. For example, the user may desire to paint portions of the image 110 using a paintbrush provided by the editing operations 120 of the image editor 100. The digital image editing program 100 may comprise a brush model 130 that is used to model such a paintbrush. The digital image editing program 100 may also comprise instructions to implement brush behavior simulation functionality 140. As will be described in greater detail below, the brush behavior simulation functionality 140 may comprise one or more operations to simulate behavior of a paintbrush. The brush behavior simulation functionality 140 may use the brush model 130.

Figure 2:
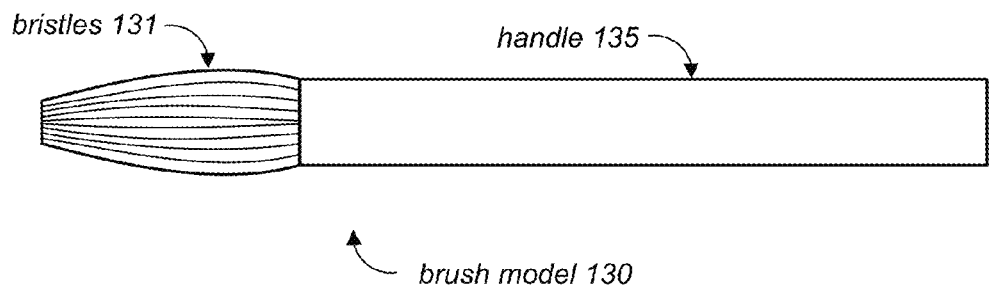
FIG. 2 is a block diagram illustrating a brush model, according to one embodiment.

FIG. 2 is a block diagram illustrating a simplified brush model according to one embodiment. In one embodiment, a brush may be simulated as a set of discrete "virtual" bristles. As shown in FIG. 2, the brush model 130 may comprise a plurality of bristles 131. The plurality of bristles 131 may also be referred to herein as bristle representations 131. In one embodiment, the brush model may also comprise a brush handle 135. The brush handle 135 may also be referred to herein as a brush handle representation 135. The plurality of bristles 131 may be attached to the end of the handle 135. In one embodiment, the bristles 131 may include a sufficient number of individual bristles (e.g., 50 to 100) for accurate simulation of the behavior of a real brush.

FIG. 3 is a block diagram further illustrating a brush model according to one embodiment. Each bristle may comprise a series of links. Each link may comprise a thin cylinder such as a cylinder having a minimal (e.g., nearly zero) radius. The links in a bristle may be connected end-to-end. The connections between links may comprise ball-and-socket joints. The connections between the handle 135 and the first link in each bristle may also comprise ball-and-socket joints. The ball-and-socket joints may permit arbitrary rotational movement with three degrees of freedom (3DOF). As shown in the example of FIG. 3, one bristle may comprise a set of links 132A, 132B, 132C, 132D. The links 132A, 132B, 132C, 132D may be connected to each other by ball-and-socket joints 133A, 133B, 133C. The bristle may be connected to the brush handle 135 by an additional ball-and-socket joint 133D. In one embodiment, the number of links in a bristle may control the size of curves that the bristle can form, where the size is proportional to the length of the bristle. Tighter curves may be possible with more links, and smoother shapes may be typical with fewer links. Because "real world" brush bristles generally do not form tight curves or small loops, few links may be used for each bristle in one embodiment.

In one embodiment, motion of the brush model 130 may be determined using standard articulated rigid body dynamics with hard constraints. Thus, for each object being simulated (e.g., each link or handle), the motion may be computed as a six-degrees-of-freedom (6DOF) rigid body which is subject to the constraints imposed by the joints between objects. A real brush bristle tends to resist deformation by exerting force to restore its shape at rest (i.e., a rest shape). To simulate the stiffness of a brush bristle, each joint in the brush model 130 may exert some force. The rest shape of the bristle may be defined in terms of the rest angles of each joint. For a straight bristle, for example, each angle may be set to zero. Joint limits may be used to restrict the valid angles of each joint to zero, and a stiff constraint force may be used to restore the joint limits. Because brush bristles are a classic stiff dynamic system comprising large forces that change quickly, an implicit solver may be used to ensure stability in one embodiment.

Different types of brushes may be simulated by varying the parameters of the brush model 130. The parameters of the brush model 130 may be altered to generate different bristle materials, different configurations (e.g., arrangements) of bristles, and different types of brush deformation behavior (e.g., bristle splitting, bristle bending, etc.). FIGS. 4A and 4B are block diagrams illustrating examples of different brush types according to one embodiment. For example, a standard round brush may have bristles distributed within a circle on the handle, with the bristles in the same direction and with a tapered end. The brush model 130A shown in FIG. 4A may simulate this circular arrangement of bristles 131A attached to a handle 135A. A flat brush may have a rectangular cross section with bristles of the same length. The brush model 130B shown in FIG. 4B may simulate this arrangement of bristles 131B attached to a rectangular handle 135B. A fan brush may distribute its bristles across an arc with radial direction and uniform length. Additionally, different bristle materials (e.g., camel hair, badger, red sable, nylon, etc.) may be simulated by changing the stiffness of each joint along the bristle. For example, some fiber types may be more stiff overall, and others may be stiff at the base but become less stiff towards the tip.

In one embodiment, the brush model 130 may be used in the simulation of brush behavior (using the brush behavior simulation functionality 140). The shape formed by the bristles in contact with the canvas may be referred to as a brush contact shape. In general, the simulation of brush behavior may include sweeping the two-dimensional (2D) image of the brush contact shape along a 2D curve defined by the motion of the brush between simulation steps. Using prior approaches to create the swept area, the 2D image was stamped at substeps along the curve to approximate the solution for a number of substeps determined by a sampling rate. Use of the brush behavior simulation functionality 140 may substantially avoid the sampling artifacts found in some prior approaches which apply a stamp along a path.

In one embodiment, continuous brush strokes may be created between discrete simulation steps using the brush model 130 discussed above. Because each bristle is simulated as a series of links, the swept volume of a bristle (i.e., the volume swept by a bristle during a stroke) may be computed as the sum of the swept volumes of each link. Each link may comprise a thin cylinder that can be approximated by a line. The swept volume of the thin cylinder may be orthographically projected into 2D to determine the final canvas mark. Therefore, instead of sweeping a cylinder to generate a volume, the final mark may be approximated by sweeping a line for each cylinder to generate a quadrilateral (also referred to herein as a quad).

To sweep a line into a quad, the quad may be constructed by connecting the end points of the beginning line segments and the end points of the ending line segments. Each quad may then be orthographically projected to the canvas plane to create the final mark. To simulate the portion of each bristle that is in contact with the canvas, a height threshold may be used to clip the portion of each bristle that is not in "contact" with the canvas (i.e., above the height threshold). Using this clipping technique, the behavior of pushing the brush harder into the canvas to create a larger mark may be simulated.

Figure 5A:
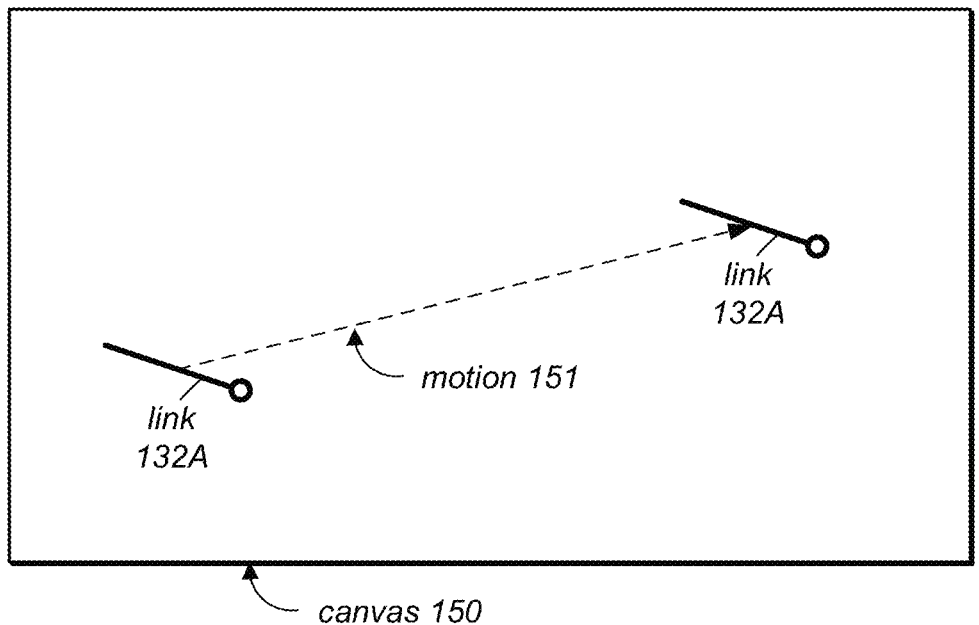
FIGS. 5A and 5B are block diagrams illustrating examples of a brush behavior simulation, according to one embodiment.
Figure 5B:
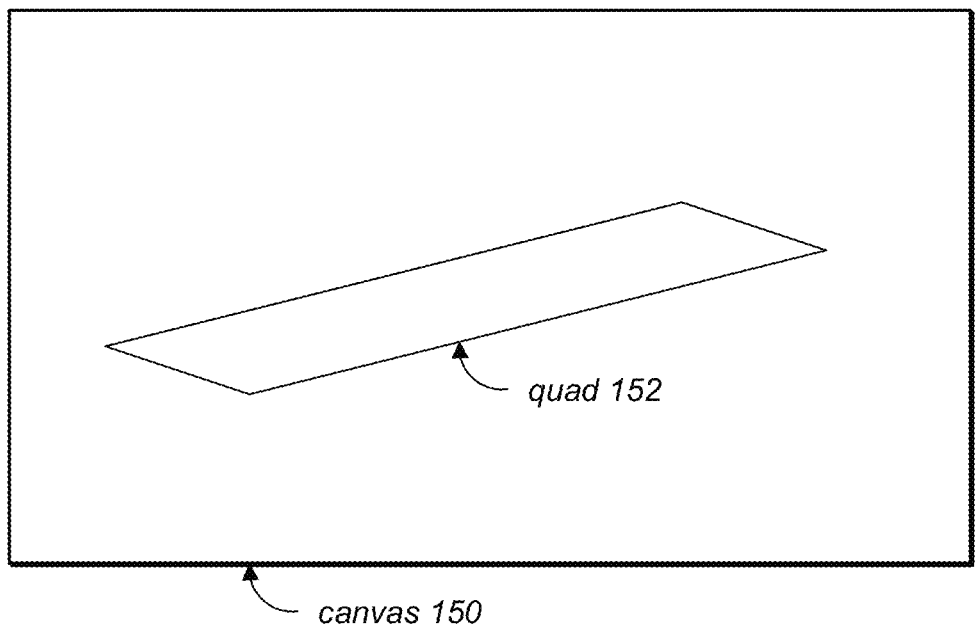

FIGS. 5A and 5B are block diagrams illustrating an example of the brush simulation according to one embodiment. FIG. 5A shows a link 132A of a bristle in "contact" with a canvas 150. The canvas 150 may represent a portion of a larger canvas. The canvas 150 is "painted" by moving the link 132A according to a particular motion 151. The two instances of the link 132A may correspond to two steps in a brush simulation. In the example shown in FIG. 5A, the entire link 132A is in contact with the canvas at both the beginning and end positions. FIG. 5B illustrates the quad 152 that is generated by the motion of the link 132A in contact with the canvas. The quad 152 may be generated by connecting the endpoints of the line segment corresponding to the link as it contacts the canvas at the two positions. A mark (also referred to as "paint" or "ink") corresponding to the quad 152, including one or more pixels with appropriate color and transparency/opacity values, may be generated in a corresponding location in the digital image 110. By generating a quad and a corresponding mark in this manner for every link in every bristle that contacts the canvas, continuous brush strokes may be created between discrete simulation steps using the brush model 130. In one embodiment, the same region of the canvas may be stroked more than once to simulate a buildup of paint or ink that results in a darker color than a single stroke.

In one embodiment, the approximation of a bristle's swept area may be inaccurate if a quadrilateral corresponding to a nearly vertical bristle is too thin to leave a mark because no pixels are hit by the projection onto the canvas. To account for this potential inaccuracy, a line segment having a width of one may be rasterized for each bristle between the end points of the bristle's last link. In this manner, each bristle in contact with the canvas may be guaranteed to make a minimum thickness mark (e.g., a mark of at least one pixel) under any deformation. Although the resulting additional pixel along the edge of the brush's mark may be incorrect when the bristle is not vertical, the error may be too small to affect the final output mark significantly.

Appropriate user input may be captured in connection with the brush behavior simulation functionality 140. For example, the user input may include a selected brush type as well as the position of the brush and the direction of its movement relative to a canvas. The user input may also include a "pressure" value that may be captured with an appropriate input device such as a digitizing tablet and/or stylus. The input pressure may be used to simulate the pressure applied to the brush. Using the brush model 130 and brush behavior simulation 140 discussed above, the input pressure may be used to deform the bristles 131 into a wide range of shapes in contact with the canvas. The shape of the brush tip may change throughout a stroke as the input pressure changes.

Figure 6:
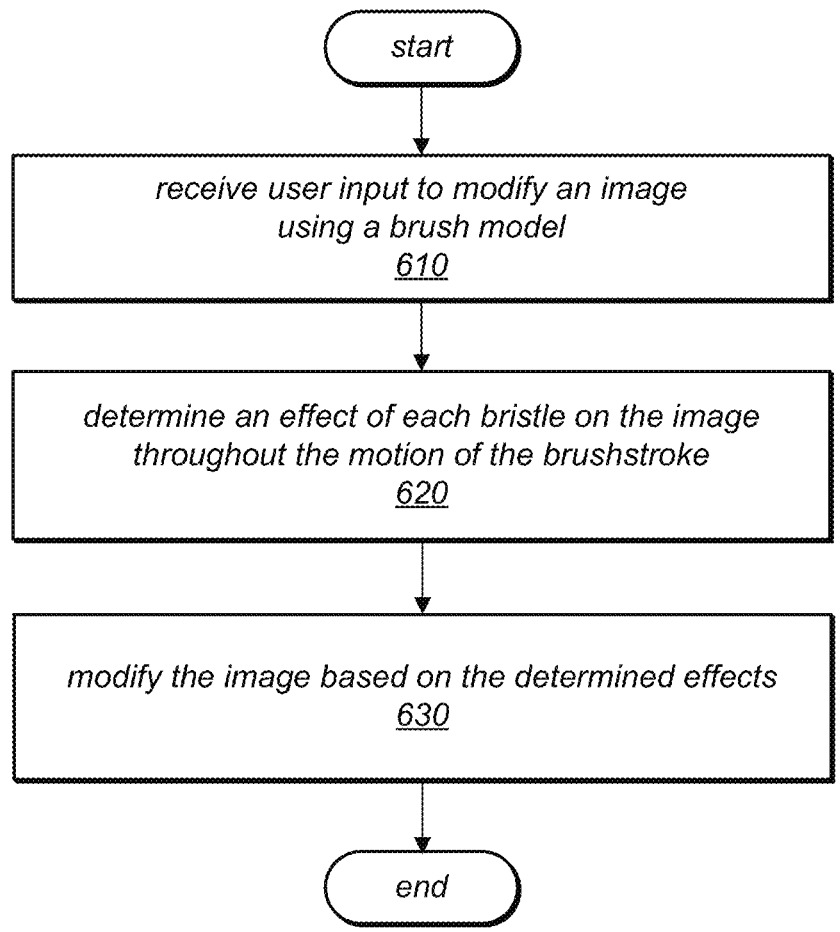
FIG. 6 is a flow diagram illustrating a method for simulating brush behavior, according to one embodiment.

FIG. 6 is a flowchart illustrating a method for simulating brush behavior according to one embodiment. As shown in 610, user input may be received to modify an image using a brush model. As discussed above, the brush model may comprise a plurality of bristle representations, and each bristle representation may comprise a series of one or more links. The user input may comprise a motion of the brush model, such as a motion between a first position (e.g., at a first simulation step) and a second position (e.g., at a second simulation step). The user input may also comprise one or more paint values representing a color of the "paint" or "ink" sought to be applied.

As shown in 620, an effect (if any) of each of the plurality of bristle representations on the image throughout the motion may be determined. In one embodiment, a continuous stroke may be determined in 620 for each of the plurality of bristle representations between the first simulation step and the second simulation step. In one embodiment, an approximation of a volume swept by each bristle representation between the first simulation step and the second simulation step may be determined in 620. In one embodiment, a clipping operation may be used in 620 to determine a portion of the plurality of the bristle representations located between a canvas and a plane above the canvas.

In one embodiment, a set of the links that contact the canvas in the first simulation step and the second simulation step may be determined in 620. A quadrilateral may be determined for each link in this set of links. The quadrilateral may comprise the end points of the portion of the respective link contacting the canvas at the first simulation step and the second simulation step. The effect of the paint in each quadrilateral may then be determined.

As shown in 630, the image may be modified based on the determined effect of each of the plurality of bristle representations on the image throughout the motion. For example, color values of pixels affected by the stroke of the brush may be modified. In one embodiment, each bristle representation in "contact" with the canvas may affect at least one pixel along its path from the first simulation step to the second simulation step.

In one embodiment, a suitable simulation engine such as the Open Dynamics Engine (ODE) may be used to implement the brush model 130 and/or brush behavior simulation 140 discussed above. ODE may comprise a framework for constrained dynamics simulations. Using ODE, each of the bristles 131 may be modeled as a chain of rigid capped cylinders (e.g., capsules) connected end-to-end by rotational joints, with each bristle attached at one end to the brush handle 135. The joints may be modeled as 3DOF ball-and-socket joints. The canvas 150 may be modeled with a single plane. The bristles 131 may collide with the plane of the canvas during a stroke, and the collision may cause the brush tip to deform. The user input may be used to generate the brush position with an explicit restorative force computed at each timestep. Given the target pose (e.g., position and orientation), the force and torque needed to change the brush's current pose and momentum to the target pose may be computed directly. The computer force and torque may be applied as external forces using the simulation engine (e.g., ODE).

Restorative forces may be used in the modeling of bristles that attempt to return to a rest shape. In one embodiment, joint limits may be specified using the simulation engine (e.g., ODE) for the modeling of restorative forces. Start and stop angles may be specified for each joint using the simulation engine (e.g., ODE). By setting all the angles to the same value, the effect of a rest angle may be created. The constraint force mixing (CFM) and error reduction parameter (ERP) for a joint may be set to yield behavior equivalent to a spring-damper system, and a force limit may keep the joint from adding too much energy to the simulation at once. In simulating a spring-damper system, the forces may be integrated implicitly so that stiff bristle behavior may be simulated in real-time.

In one embodiment, explicit angular spring forces may be specified using the simulation engine (e.g., ODE) for the modeling of restorative forces. Start and stop angles may be specified for each joint using the simulation engine (e.g., ODE). By setting all the angles to the same value, the effect of a rest angle may be created. The pose of the links may be used to compute the angular spring torques manually after each simulation step. The angular spring torques may then be applied to the links as external forces.

The simulation engine (e.g., ODE) may be used to implement a constrained dynamics simulation. A constrained dynamics simulation may solve for constraint forces by creating an N·N matrix, where N is the number of degrees of freedom that are constrained. For bodies called islands that do not have constraints between them and do not interact, the matrix may be split into separate matrices for each island. Each matrix may be solved independently for a particular island. Because solving the matrix may be a problem of complexity $O(N^3)$, solving islands separately may typically be faster than solving the same bodies as one interrelated system. Therefore, the simulation of the brush behavior may be more computationally efficient if the brush bristles are separated so they are independent of one another.

As discussed above, each bristle may be connected by a joint to the same brush handle 135. However, because the handle mass may be large in comparison to the bristle mass, the error in brush pose for each frame may be very small. Thus, the brush handle 135 may be modeled as many separate brush handle bodies using the simulation engine (e.g., ODE). Each bristle may be attached to one of the separate brush handle bodies using a ball-and-socket joint. Although the computation of the force and torque necessary to move a brush handle may be performed separately for each brush handle body, such a computation is relatively inexpensive. The separation of the bristles permitted by the use of multiple brush handle bodies may permit each bristle to be solved independently. Therefore, the brush behavior simulation 140 may be both computationally efficient and scalable in a multi-processor or multi-core environment. In one embodiment, for example, 40 bristles may be simulated at 60 Hz on one core; alternatively, 75 bristles may be simulated at 30 Hz on one core.

In one embodiment, inter-bristle forces may be simulated. By including bristle-to-bristle collisions, contact joints between bristles may be created to enforce penetration constraints. By simulating inter-bristle forces, the bristles may spread and appear to maintain the volume of the brush tip more naturally when pressed into the canvas. In one embodiment, an approximation of the inter-bristle forces may be included in the brush behavior simulation 140 to achieve similar effects in a more computationally efficient manner. For example, explicit penalty forces may be added to provide similar bristle-to-bristle collision behavior without the need for additional constraints.

In one embodiment, the simulation engine (e.g., ODE) may provide various of mechanisms for enforcing constraints in the simulation. One constraint enforcement mechanism may be referred to as dWorldStep. The dWorldStep functionality may be used to construct and solve the constraint matrix in $O(N^3)$ time. Another constraint enforcement mechanism may be referred to as dWorldQuickStep. The dWorldQuickStep functionality may be used to perform iterative relaxation to approximate the correct constraint forces in $O(M\ N)$ time, where M is the number of iterations (e.g., 20). In one embodiment, the use of dWorldQuickStep in the brush behavior simulation may be faster than the use of dWorldStep. For example, for a 5-link bristle in which each joint is 3DOF, there are 15 constraints. Solving the matrix using dWorldStep may take approximately 3375 (i.e., $15^3$) units of time while solving the approximation using dWorldQuickStep may take approximately 300 (i.e., 15×20) units of time. The relative efficiency of dWorldQuickStep may be even more pronounced when inter-bristle forces are included.

As previously noted, colors in the images in digital documents (and in the "paint" of image editing applications) are often represented in a color space such as RGB, CMYK, or other color spaces. To these linear color channels, an alpha channel (A) is typically added to represent opacity of the paint. For example, an alpha value may be used to support operations involving paints that have varying levels of opacity, such as a thin acrylic paint versus a thick oil paint. Documents and image editing applications may store pixel data as RGBA or CMYKA values, for example, in data structures configured to store four or five values for each pixel, respectively. In the descriptions that follow, each of the color channels (e.g., the R channel, G channel, and B channel) is treated individually and identically. Therefore, they are represented in various equations herein using the single letter C, such that each of these equations is applied individually to each of the color channels. Using this terminology, regular digital documents may consist of c and a channels, and these channels may be combined in different ways.

Note that in standard computer graphics terminology, when drawing into a canvas or buffer, the term "destination" generally refers to a value that is already stored at a given pixel of the targeted canvas or buffer, the term "source" refers to a value that is being drawn into the canvas of buffer (i.e. a value used to modify the value of a given pixel of a canvas or buffer through an image editing operation), and the term "new destination" refers to the updated value of a given pixel in the canvas or buffer after rendering the results of drawing into the canvas or buffer. Therefore, in general, the letter S may be used herein to refer to a source (e.g., a source pixel of a canvas or paint brush model), the letter D may be used to refer to a destination (e.g., a destination pixel on a canvas or paint brush model), and D' may be used to refer to an updated destination after an image editing operation has been applied (e.g., an operation to combine, mix, or deplete paint on a canvas or brush model). In the examples that follow, the subscripts c and a are used to denote color and alpha channels, respectively.

In a typical application that operates in RGBA or CMYKA space, for example, alpha compositing may involve new pixel data (e.g., "paint" data applied by a tool in a drawing or painting application) being composited over existing canvas pixel data, at least partially obscuring the existing data. Such compositing may be performed in accordance with the following equations:

$$D_c' = S_a S_c + (1-S_a) D_c \quad (1)$$

$$D_a' = S_a + (1-S_a) D_a \quad (2)$$

In typical image editing applications, mixing of source and destination pixels (e.g., mixing two paint colors on a brush, or mixing paint on a brush with paint previously deposited on a canvas) may involve determining new color and alpha values for the destination pixels such that the contribution of the source and destination pixel data is relative to their respective alpha values. Such mixing may be performed in accordance with the following equations:

$$D'_c = \frac{S_a S_c + D_a D_c}{S_a + D_a} \quad (3)$$

$$D'_a = S_a + D_a \quad (4)$$

In other words, a compositing operation may simulate the effect of applying one layer of paint on top of another layer of paint that has already dried, while a mixing operation may simulate the effect of stirring two wet paints together on a brush and/or canvas.

As previously noted, a realistic simulation of the deposition of natural media paints in an image editing application, such as those described herein, may apply logic about the physics of fluids. For example, one of the important behaviors of real paints is the pickup of wet paint off a canvas, dirtying the brush. In the examples described herein, paint (e.g., on a brush or canvas) may be defined as the set of color channels and the alpha channel used in the canvas document format. For example, a document comprising images created and/or modified using an image editing application may employ an RGBA or CMYKA format. However, since all color channels are treated identically and independently, the systems and methods described herein are agnostic to the specific color space representation employed in a given document format or image editing application, and may be applied with any suitable color space representation that includes both color values and an alpha value. To properly mimic the deposition behavior of various paints and to support the simulation of such behavior, the systems and methods described herein may employ an additional channel of data for each pixel of a brush model and/or canvas. This additional channel, denoted as the F channel (or fill channel) may in various embodiments represent the amount of paint stored in the unit volume of the canvas or brush in an image editing application. As described in more detail below, in order to take advantage the addition of the F channel in simulating realistic painting behaviors, the system and methods described herein may include additional logic to support blending, mixing, and compositing operations using this additional data (e.g., data representing pixels in an RGBAF or CMYKAF color space). In the examples that follow, the subscript f is used to denote a fill channel.

The systems and methods described herein may in various embodiments enable the simulation of the real motion of paint between a brush and a canvas, and around the canvas (e.g., using the brush to spread paint around). In some such embodiments, a user may be able to simulate the effects of the deposition of an additional amount of paint (e.g., increasing the volume of paint deposited on the canvas), or the removal of an amount of paint (e.g., decreasing the amount of paint on the canvas) as a result of different image editing operations. The manipulation of pixel data to reflect changing amounts of paint at various brush and/or canvas pixels may in some embodiments result in more realistic paint simulations than those produced using previous approaches that assume a constant volume of paint even after mixing or compositing paints on a canvas. For example, in some embodiments, users may be able to "pick up" paint from a canvas and move it around using a brush tool. In order to support such operations, the system described herein may keep track of the amount of paint stored per pixel by storing data reflecting the amount of paint in the new fill channel for each pixel. For example, the fill channel value of a pixel of an image may reflect the amount of paint stored at that pixel on the canvas. In systems in which brush simulations store paint on the brush, as described above, a fill channel value may represent the amount of paint stored on the brush.

In some embodiments, the fill channel value may vary across the range [0, ∞], with the upper limit being dependent on the data resolution supported in the particular image editing application, and on the mapping between the range of available values in the application and the storage capabilities of the system on which it executes. In the examples that follow, a value of f=1 may be defined as one "pixel's worth" of paint. Therefore, decreasing the value of f (e.g., such that f<1) may reduce the apparent opacity of the paint at the pixel, while increasing the value of f (e.g., such that f>1) may increase the apparent opacity of the paint at the pixel.

Note that the addition of a fill channel for pixel data may be applied generally in any application in which image data is created, modified, or displayed, since the fill channel described herein is not necessarily tied to a physical simulation (as some prior solutions for representing paint volume are). In some embodiments, fill channel values may be output from a physical simulation (such as a fluid simulation) or from a model of pigments for use in the image editing operations described herein, while in other embodiments fill channel values may not come from a physical simulation or pigment model. For example, in some embodiments, fill channel values may be generated using a simple pattern stamping approach, such as that described herein. In addition, the methods described herein for calculating the effects of various image editing operations on the color and/or opacity of a destination pixel (e.g., for generating the color to be displayed as a result of such operations) may be much simpler and more general than those of various prior approaches. For example, some prior approaches use complex rendering equations called the Kubelka-Munk equations to calculate final colors based on underlying pigment models and their combinations, the amounts of each pigment in a given paint, and the lighting. Note that while the systems and methods described herein do not require the use of a fluid simulation, they may be used in conjunction with a fluid simulation. For example, each of a plurality of fluid simulation layers may be used to compute their own amounts of paint at each pixel (e.g. their own fill channel values), and the methods described herein may be used to combine the results into a single color at each pixel.

As noted above, the system and methods described herein may in some embodiments take advantage of fill channel values associated with the pixels of a brush model and/or canvas to more realistically simulate the behavior of various image editing operations, including operations that simulate the compositing, mixing, or removal of paint(s). In some embodiments, the system may be configured to store fill channel values in the image file (e.g., in a document containing the image) so that when it is opened for subsequent editing, the fill channel values are available to use in computing the effects of various editing operations. However, in order to display the results of an image editing operation (e.g., images modified by a compositing, mixing, or depletion operation) on a screen or monitor, or to print the modified images, the pixel data stored in the document may need to be converted to a representation that does not include fill channel values (e.g., an RBGA or RGB representation). In other words, in some embodiments, display and/or printing operations may not support pixel data that includes an alpha channel and/or a fill channel.

In some such embodiments, pixel data that includes alpha and/or fill channel values may be converted on the fly to representations that do not include this information for display, but the full pixel data, including this information, may be stored for as long as the user wants to be able to edit it. For example, in some embodiments, after new RGBAF values have been calculated for an image being edited in a graphics application or image editing application, these values may be converted (e.g., in real-time) to RGBA or RGB data for display by the application, and/or they may be converted to RBG data for printing. In other embodiments, RGBAF values may be temporarily stored for use by the image editing application during an image editing session, but may be converted to RGBA data, RGB data, or another representation to be saved with (or within) the image file at the end of the editing session. In some embodiments, converting RGBAF pixel data to an RGBA representation of the pixel data may be performed according to the following equations:

$$D_c' = D_c \quad (5)$$

$$D_a' = D_f * D_a \quad (6)$$

where $D_f^* = \min(D_f, 1)$

As illustrated equations 5 and 6 above, when converting pixel data from an RGBAF representation to an RGBA representation, the color channel values may stay the same, but the opacity (alpha channel) values may change due to the additional information provided by the fill channel. In other words, the systems and methods described herein may operate on the assumption that the amount of paint in a given paint sample (as represented by the fill channel value) affects the opacity, but not the color, of the sample. For example, if one unit of paint is red and opaque, then half a unit of that paint will still be red. However, because there is half as much paint, the paint may let some light through, such that the sample is (for example) about 50% transparent. Similarly, if one unit of paint is red and 50% opaque, then half a unit of that paint will still be red, but it may be 25% opaque (i.e. twice as transparent) because the fill is less. These concepts are further illustrated by the following examples, which describe how the use of a fill channel changes the results of various image editing operations to support more realistic painting effects. The fill channel operator (i.e. the asterisk operator) illustrated in equation 6 above is described later.

Figure 7:
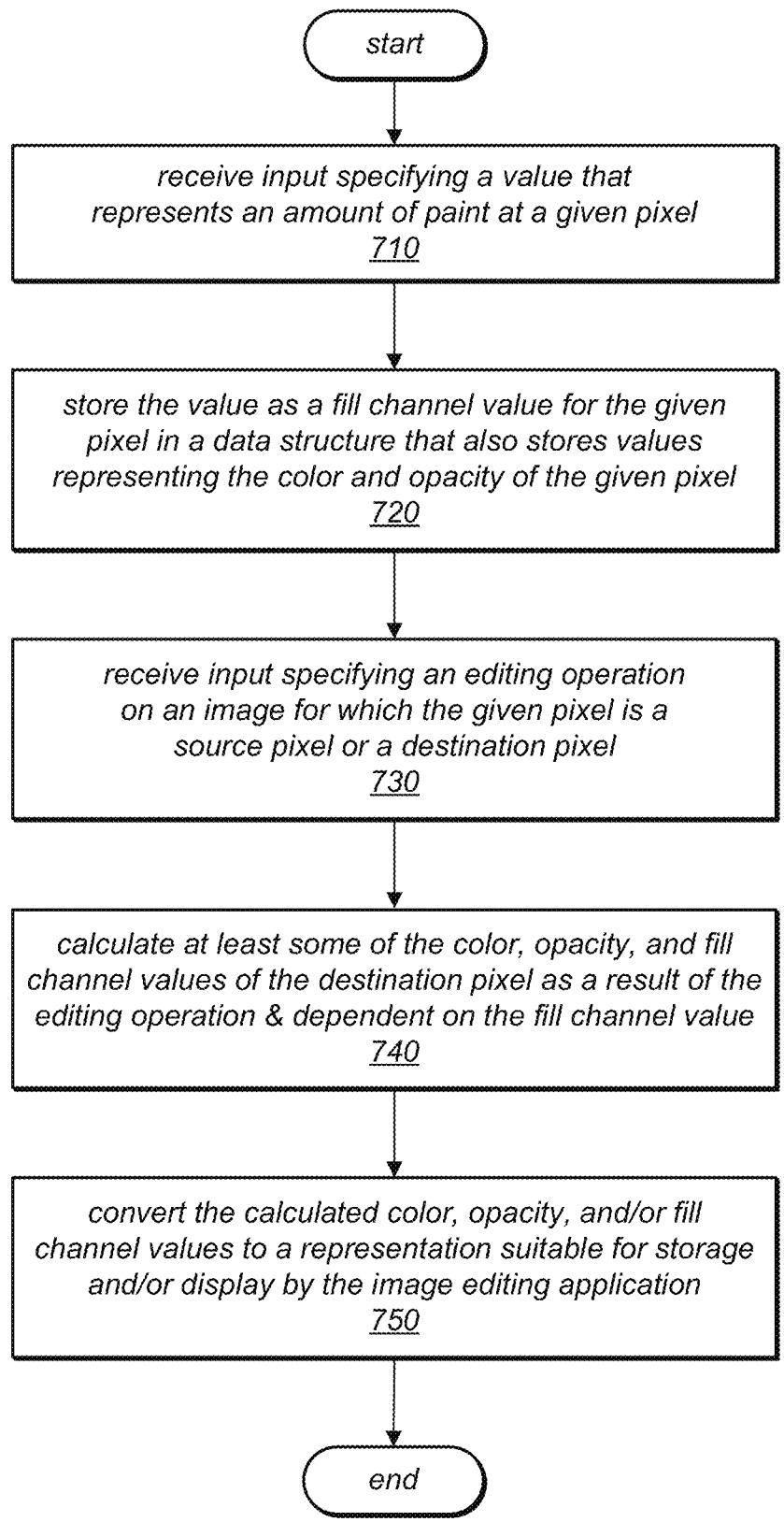
FIG. 7 is a flow diagram illustrating a method for performing an image editing operation in a color space that comprises a fill channel, according to one embodiment.

FIG. 7 illustrates a method for using a fill channel in an image editing operation, according to one embodiment. As illustrated at 710, in this example, the method may include receiving input specifying a value that represents an amount of paint at a given pixel. For example, the given pixel may be a pixel of an image being editing using an image editing application. In another example, the given pixel may represent a bristle of a bristle brush in a simulation (or a portion thereof), as described above. As previously noted, such data may be received from a variety of sources, including, but not limited to, a physical brush simulation or fluid simulation, a pattern stamping operation, a user input mechanism, or a previously performed image editing operation, in different embodiments. In still other embodiments receiving input specifying an amount of paint may involve accessing pixel data that includes this information from image data stored in memory (e.g., in a stored image file or document).

As illustrated in this example, the method may include storing the value as a fill channel value for the given pixel, as in 720. In various embodiments, this fill channel value may be stored in a data structure that also stores values representing the color and/or opacity of the given pixel (or of the paint at the given pixel). For example, if the image or brush simulation represents colors in an RGBA color space, the fill channel value may be stored along with the red, green, blue, and alpha channel values as a variable (or in a data structure) comprising five integer or floating point values, each of which reflects the value associated with a respective one of these channels at the given pixel.

As illustrated at 730 in FIG. 7, the method may include receiving input specifying an editing operation to be applied to an image (e.g., by an image editing application) for which the given pixel is either a source pixel or a corresponding destination pixel associated with the operation. In one example, the given pixel may be a source pixel, representing a pixel of a brush model or a paint reservoir. In another example, the given pixel may be a destination pixel (e.g., a canvas pixel). As illustrated at 740, in this example, the method may include calculating at least some of the color, opacity, and fill channel values of the destination pixel as a result of the editing operation and dependent on the fill channel value of the given pixel. For example, the editing operation may involve the deposition or removal of "paint" from an image being edited, and may be manifested as a compositing operation, a mixing operation, or a depletion operation with respect to the destination pixel. In these examples, the method may include calculating a new color, opacity, and/or fill channel value for the destination pixel dependent on the particular operation being applied at the given pixel and dependent on a fill channel value specified for the source pixel and/or the destination pixel.

As illustrated in FIG. 7, the method may in some embodiments include converting the calculated color, opacity, and/or fill channel value to a representation suitable for storage and/or display by the image editing application, as in 750. For example, in some embodiments, new or modified RGBAF values that have been calculated for the destination pixel may be converted to an RGBA representation for storage or display, or to an RGB representation for display or printing. In other embodiments, RGBAF values may be stored with the (image/document) and/or in a data structure accessible to the image editing application for subsequent use by the image editing application during this or another image editing session. In various embodiments, the operations illustrated in 710-750 may be repeated for any other pixels affected by this and/or other editing operations (not shown).

In some embodiments, the system and methods described herein may be employed in an image editing application that simulates brush behavior, as described above. In such embodiments, as each instantaneous contact area is computed during a brush stroke, the transfer of paint between the brush and canvas may be simulated. Through this simulation, the effects of non-uniform brush paint load, brush drying, and brush dirtying may be enabled. In some embodiments, the system may employ a model of paint load that is based on simple per-channel linear blending operations, and this model of paint load may be useable with arbitrary document color spaces, such as RGB, CMYK, Lab, or others. In some embodiments, blending math (e.g., calculations for compositing, mixing, and/or removing paints) may be carried out in 32-bit floating point. However, careful consideration of conversion and rounding may allow canvas data of arbitrary bit-depth (generally 8, 16, or 32 bits per channel) to be manipulated without algorithmic changes. In some embodiments, a non-uniform paint load may be used to represent the distribution of different pigments of paint across a brush tip, and this may be represented in the image editing application using a "paint reservoir buffer". For example, each bristle in a brush behavior simulation may have a 1D texture mapped along it, and the set of these 1D textures may be stored as a single 2D texture for the brush. The color stored in each atomic texture element (i.e. a "texel") may represent the small volume of paint surrounding a portion of the length of a bristle. In such embodiments, when the instantaneous brush stamp is rasterized, texture mapping may be used to apply the reservoir buffer to the path followed by the bristle.

In some embodiments, the system and methods described herein may allow intuitive user control over the paint mixing process by exposing three paint parameters: load, wetness, and mixing. In such embodiments, the load parameter may determine the amount of paint stored in the reservoir buffer upon filling it with paint, and a load of 100% may indicate that the reservoir will not be depleted for infinitely long strokes. In some embodiments, the wetness parameter may specify the amount of paint that can be picked up from the canvas into the pickup buffer. For example, a wetness value of 0% may indicate that the paint on the canvas is dry, and a wetness value of 100% may indicate that all of the paint can be picked up. The rate at which picked up paint is mixed with reservoir paint may be represented by the mixing parameter. For example, a mixing value of 100% may indicate that in a mixing operation, all of the picked up paint is deposited first, while a mixing value of 0% may indicate that only a small amount of picked up paint is added to the reservoir paint.

The reservoir buffer may store RGBA data values, or data values in another representation for the color space of the image being edited and/or a file or document in which the image will be saved. The addition of the fill channel described herein may in some embodiments support the simulation of the effects of brush drying. For example, in some embodiments the F channel may store the amount of paint stored at each texel, in units of canvas pixels. In such embodiments, during the stroke, as each brush stamp is rasterized, the fill channel values for the portions of the bristle that are in contact with the canvas may be reduced. This may eventually cause them to be emptied such that no more paint can be applied from those areas.

Brush dirtying requires paint to be picked up from the canvas as part of the deposition process. However, after the dirty paint is deposited, the brush should return to its original color. Therefore, in some embodiments, picked up paint may be stored in a second texture called the pickup buffer, which has the same mapping as the reservoir buffer. In such embodiments, after the brush stamp is rasterized, the pixels of the canvas underneath the stamp may be sampled and mixed with the values stored in the pickup buffer, and the fill channel values of the pickup buffer pixels may be increased. The picked up paint may then be mixed with the reservoir paint to determine the actual deposited color. By storing the pickup and reservoir buffers separately, the system may be able to control the mixing of paint to produce realistic looking results. For example, the system may prefer to deposit the picked up paint first, as it should be on the exterior surface of the brush and in closer contact with the canvas. This may skew the mixing in favor of the pickup buffer. As the pickup buffer nears empty, more of the paint from the reservoir buffer may be deposited, depleting the reservoir buffer. In this example, the sum of the picked up paint and the reservoir paint may equal the total desired paint deposition. In some embodiments, the fill channel values for the brush model may be stored throughout an image editing session, but may not be saved between editing sessions, e.g., when the image editing application does not support storing the amount of paint on a brush at the end of a "painting" session.

In some embodiments, to enable conservation of paint during and between strokes, the canvas may also be augmented with an F channel. This may allow a brush stroke to pick up and put down the same paint repeatedly without changing the overall amount of paint on the canvas. However, it may sometimes be necessary to deal with documents that do not support the addition of a fill channel. In these cases, the methods described herein for simulating brush behavior may still be conducted in a color space that includes a fill channel (e.g., RGBAF space). For example, in some embodiments in which the canvas pixels do not include a fill channel, the system may store fill channel values for paint on the brush, while canvas pixels may be treated as though they store a unit amount of paint (i.e. they may be assumed to have a uniform, default fill channel value of 1). In such embodiments, if paint needs to be added or removed from the canvas, a new RGBAF value may be computed, which may then be converted to an RGBA representation using the equations above. This may have the effect of always keeping the amount of paint fluid on the canvas the same, but changing the density of pigment in that fluid based on the fill channel value associated with the paint on the brush. More generally, when only one of the source pixel and the destination pixel is represented in a color space that has been augmented to include a fill channel, the pixel that is represented in a color space that does not include a fill channel may be assumed to store a unit amount of paint (or another default fill channel value) for the purpose of calculating the results of the compositing, mixing, and/or depletion operations described herein.

Figure 8:
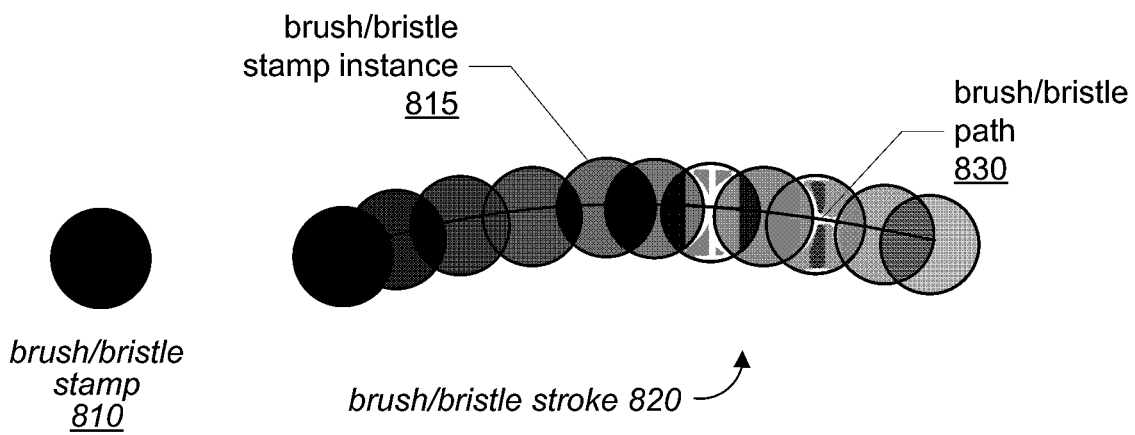
FIG. 8 illustrates the generation of a brush stroke from a stamp, according to one embodiment.

As previously noted, in some embodiments, fill channel values may be computed as an output of a pattern stamping operation. FIG. 8 illustrates one example of the effect of a stamping operation on the amount of paint deposited during a long brush strong, i.e. it illustrates how the amount of paint may vary across the stroke. As described herein, in some embodiments, the amount of paint stored by a brush (or bristle thereof) may be reflected by a fill channel value for the brush/bristle, and the amount of paint available for deposition may decrease as paint is deposited throughout a brush/bristle stroke. Note that in this example, it may be assumed that the stamping operation is applied to a blank canvas. Therefore, the stamping operation may not result in a compositing or mixing operation. However, if the canvas were not blank prior to the application of the stamping operation, the color, opacity and/or fill channel values of the destination pixels may be dependent on the color, opacity and/or fill channel values for those pixels prior to the application of the illustrated brush/bristle stroke. In the example illustrated in FIG. 8, a brush simulation represents the deposition of paint by a brush stroke (or by a bristle stroke thereof) as a series of instances of brush/bristle stamp 810. In this example, brush/bristle stamp 810 has a circular shape, although other brushes or bristles may be modeled as depositing paint using stamps of other shapes. In this example, a brush/bristle stroke 820 (from left-to-right across an image) is simulated as a series of brush/bristle stamp instances 815 along a curved path 830. As paint is deposited on the canvas, the amount of paint left on the brush/bristle (and, thus, the fill channel value associated with the brush/bristle) decreases. Therefore, the opacity of the destination pixels targeted by the brush stroke is modified, dependent on the fill channel value of the brush/bristle at the time of each successive stamp instance in the brush/bristle stroke. In the example illustrated in FIG. 8, the same color is deposited on the canvas (and, thus, at the destination pixels) by each of the stamp instances, but the opacity at the destination pixels varies from 100% to 50% as the paint on the brush/bristle is depleted.

In some embodiments, the system and methods described herein may employ a special-purpose operator applicable to fill channel values. As previously noted, this f channel operator (illustrated in various equations herein as an asterisk operator) returns the minimum of the actual fill channel value or a value of 1 (i.e. it returns a value in the range of 0 to 1). In other words, the * operator may be define this way: x*=min (x, 1). In various embodiments, even though the fill channel value associated with a given pixel and/or stored in the system for that pixel may have a value greater than 1, its value may be clamped at a value of 1 for use in some of the equations used to calculate a new color or opacity following an image editing operation (e.g., a compositing operation, as described below), or when converting an opacity value in an RGBAF representation to an opacity value in an RGBA representation, as described above.

A compositing operation may be thought of as an operation in which one amount of paint is deposited on top of another amount of paint that has already dried. As a result of a compositing operation, the fill channel value for pixels affected by the operation may be equal to the sum of the fill channel values of the two paints involved, with the paint that is on top is obscuring somewhat the paint beneath. The use of the f channel operator (i.e. the asterisk operator) in compositing operations may in some embodiments ensure that as paint is added to a pixel through one or more compositing operations, the resulting alpha value remains in the range between 0 and the alpha value of the paint being deposited, e.g., for display purposes. For example, if paint being deposited on a canvas is 50% transparent (i.e. it has an opacity value of 50%) and a thick layer is deposited, the user would expect the paint deposited to be about 50% transparent. However, if more of this paint (or some amount of another paint having 50% opacity) were deposited on top of this layer of paint, the user would not expect the result to be more than 50% opaque (since the paint itself has the property that it is 50% opaque). If fill channel values were used in the compositing equations above without being capped at a value of 1, when new alpha values for the destination pixels are calculated (e.g., according to equation 8 below), as more and more paint is added, the opacity value would continue to increase even though the specified opacity for the paint itself if 50%. In this case, the paint in the affected area would get more and more opaque until it is fully opaque, which is probably not what the user expects. On the other hand, clamping the fill channel value at 1 in computations to determine the final alpha value for display of the affected pixels, in this example, may ensure that the alpha value is never greater than 50% if none of the paint deposited in the affected area has an opacity value of 50% or less.

In some embodiments, calculating new values for color, opacity, and fill channel values when compositing paint over previously deposited paint (in systems that represent pixel data in a color space that includes a fill channel value, such as RGBAF) may be performed according to the following equations:

$$D_c' = S_f * S_a S_c + (1 - S_f * S_a) D_f * D_c \quad (7)$$

$$D_a' = S_f * S_a + (1 - S_f * S_a) D_f * D_a \quad (8)$$

$$D_f' = S_f + D_f \quad (9)$$

Figure 9:
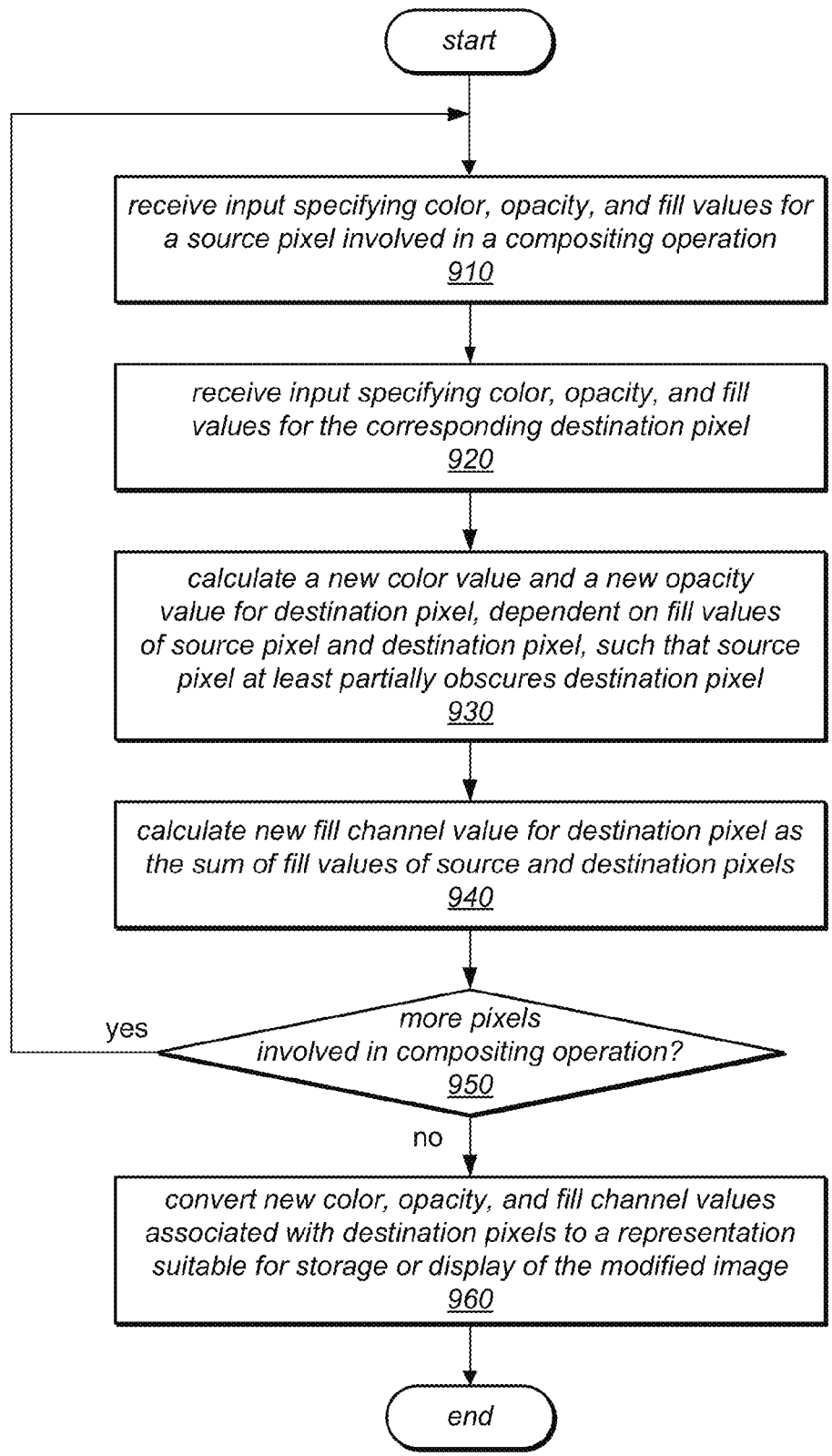
FIG. 9 is a flow diagram illustrating a method for performing a paint compositing operation using a color space representation that includes a fill channel, according to one embodiment.

FIG. 9 illustrates a method for compositing two colors using a color space representation that includes a fill channel, according to one embodiment. As described herein, the result of such a compositing operation may be that paint deposited on top of previously deposited paint at least partially obscures the previously deposited paint, dependent on the opacity and/or fill channel values of each of the paints. As illustrated in this example, the method may include receiving input specifying color, opacity, and fill channel values for a source pixel involved in a compositing operation, as in 910. The method may also include receiving input specifying color, opacity, and fill channel values for the corresponding destination pixel (i.e. a destination pixel over which the source pixel data is to be composited), as in 920. As noted above, input specifying source pixel data and/or destination pixel data may be received in a variety of ways, including as an output of a physical brush simulation, fluid simulation, pattern stamping operation, or previously performed image editing operation, as user input, or as image data accessed from an image file or other document stored in memory.

As illustrated at 930 in FIG. 9, the method may include calculating a new color value and a new opacity value for the destination pixel, dependent on the fill channel values of the source pixel and the destination pixel, such that the source pixel at least partially obscures destination pixel. For example, in some embodiments calculating the new color value for the destination pixel may be performed in accordance with equation 7 above, and calculating the new opacity value for the destination pixel may be performed in accordance with equation 8 above. As seen in these equations, the resulting color and opacity values are both dependent on the source and destination fill channel values. As illustrated in this example, the method may include calculating a new fill channel value for the destination pixel as the sum of the fill channel values of the source and destination pixels (as in 940). In other words, the calculation of the new fill channel value may be performed, for example, in accordance with equation 9 above.

If there are more pixels involved in the compositing operation, shown as the positive exit from 950, the method may include repeating the operations illustrated in 910-940 for these additional pixels. If not, shown as the negative exit from 950, the method may include converting the new color, opacity, and fill channel values associated with the destination pixels into a representation that is suitable for storage (e.g., within the image editing application, or within an image file or other document) and/or for display of the modified image (e.g., on a display monitor, or as a printed image), as in 960. In some embodiments, such a conversion may be performed in accordance with equations 5 and 6 above. Note that in some embodiments, the image editing application may store pixel data for the canvas and/or brushes in multiple buffers, each employing a different color space representation (e.g., one that stores fill channel values, and one to be used for display that has been converted to a color space representation that does not include fill channel values).

If, during an image editing operation, some amount of paint is deposited on top of another amount of paint that has not already dried, the effect of the operation on the destination pixels may involve a mixing of the two paints, rather than the new paint obscuring the previously deposited paint. In some embodiments, as result of a mixing operation, two paints may be blended into a homogeneous paint mixture the color and opacity of which are calculated in a manner different than that used to calculate the final color and opacity of destination pixels in a compositing operation. However, as is the case in a compositing operation, the fill channel value of the destination pixels following a mixing operation may be the sum of the fill channel values of the source and destination pixels prior to the mixing operation. This is shown in equation 12 below, which is similar to equation 9 above. In some embodiments, calculating new values for color, opacity, and fill channel values when mixing two paints (in systems that represent pixel data in a color space that includes a fill channel value, such as RGBAF) may be performed according to the following equations:

$$D'_c = \frac{S_f S_a S_c + D_f D_a D_c}{S_f S_a + D_f D_a} \quad (10)$$

$$D'_a = \frac{S_f S_a + D_f D_a}{S_f + D_f} \quad (11)$$

$$D'_f = S_f + D_f \quad (12)$$

Figure 10:
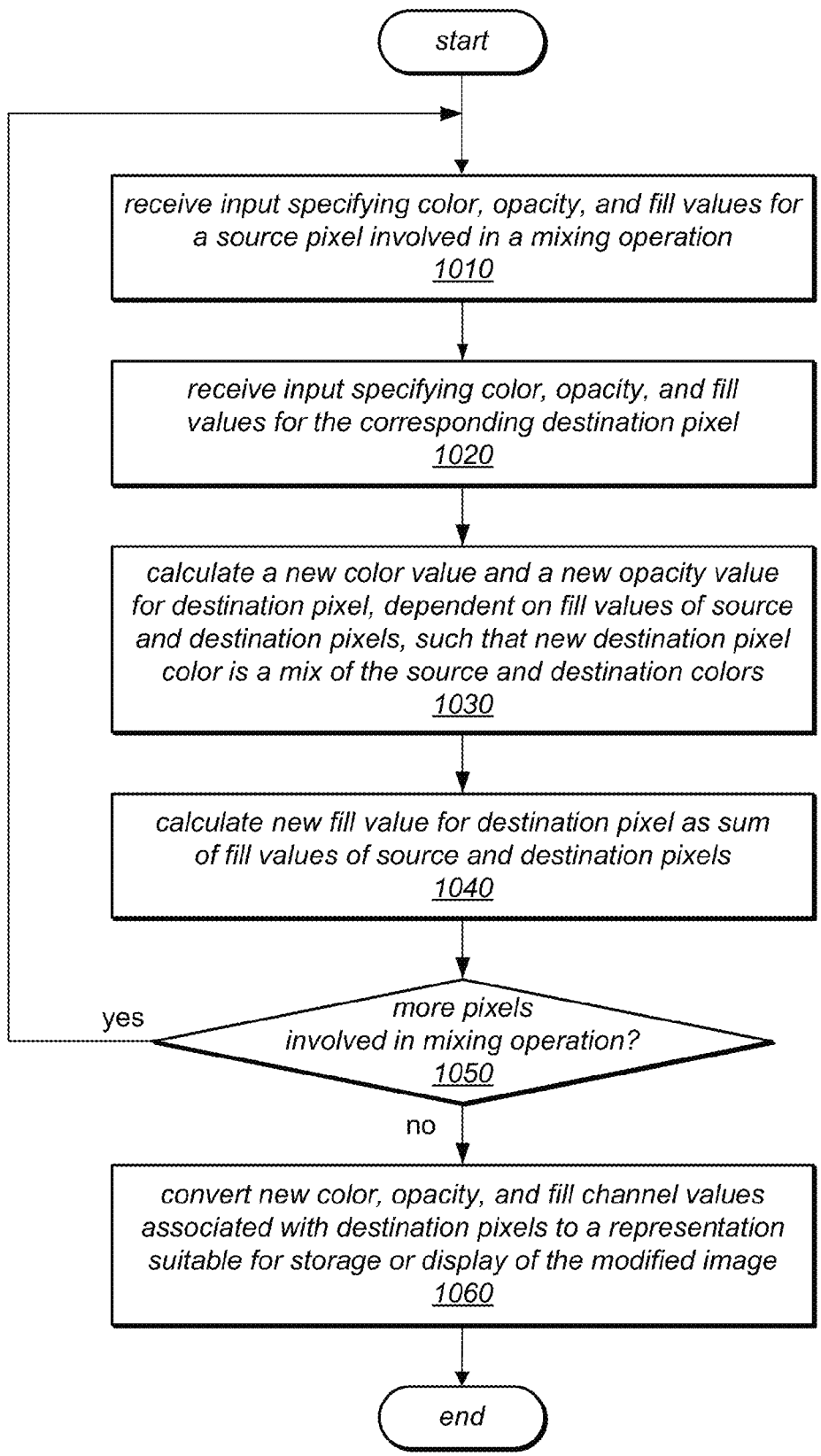
FIG. 10 is a flow diagram illustrating a method for performing a paint mixing operation using a color space representation that includes a fill channel, according to one embodiment.

FIG. 10 illustrates a method for mixing two colors using a color space representation that includes a fill channel, according to one embodiment. As illustrated in this example, the method may include receiving input specifying color, opacity, and fill channel values for a source pixel involved in a mixing operation, as in 1010. The method may also include receiving input specifying color, opacity, and fill channel values for the corresponding destination pixel (i.e. a destination pixel with which the source pixel is to be mixed), as in 1020. As noted above, input specifying source pixel data and/or destination pixel data may received in a variety of ways, including, but not limited to, as an output of a physical brush simulation, fluid simulation, pattern stamping operation, or previously performed image editing operation, as user input, or as image data accessed from an image file or other document stored in memory.

As illustrated at 1030 in FIG. 10, the method may include calculating a new color value and a new opacity value for the destination pixel, dependent on the fill channel values of the source pixel and the destination pixel, such that the new destination pixel color is a mix of the source and destination colors. For example, in some embodiments calculating the new color value for the destination pixel may be performed in accordance with equation 10 above, and calculating the new opacity value for the destination pixel may be performed in accordance with equation 11 above. As seen in these equations, the resulting color and opacity values are both dependent on the source and destination fill channel values. As illustrated in this example, the method may include calculating a new fill channel value for the destination pixel as the sum of the fill channel values of the source and destination pixels (as in 1040). In other words, the calculation of the new fill channel value may be performed, for example, in accordance with equation 12 above.

If there are more pixels involved in the mixing operation, shown as the positive exit from 1050, the method may include repeating the operations illustrated in 1010-1040 for these additional pixels. If not, shown as the negative exit from 1050, the method may include converting the new color, opacity, and fill channel values associated with the destination pixels into a representation that is suitable for storage (e.g., within the image editing application, or within an image file or other document) and/or for display of the modified image (e.g., on a display monitor, or as a printed image), as in 1060. In some embodiments, such a conversion may be performed in accordance with equations 5 and 6 above. Again, note that in some embodiments, the image editing application may store pixel data for the canvas and/or brushes in multiple buffers, each employing a different color space representation (e.g., one that stores fill channel values, and one to be used for display that has been converted to a color space representation that does not include fill channel values).

As used herein, the term "depletion operation" may refer to an image editing operation that reflects the removal of some amount of previously deposited paint. For example, in some embodiments, an image editing application may include an eraser tool or a scraping tool, which may be manipulated to swipe across a portion of an image being edited within the application in which paint was previously deposited in order to scrape away at least some of the paint deposited there. In some embodiments, a depletion operation may not change the color at the pixel (assuming that some of the paint having the same color as the exposed and scraped paint remains). However, a depletion operation may change the opacity and/or fill channel values of the pixels on which it is applied. For example, when some paint is removed from a canvas, the fill channel amount may be decreased to correctly reflect the fact that the amount of paint at the affected pixels has decreased, and the opacity value may also be decreased to reflect the fact that if paint is removed, the remaining paint may appear to be more transparent. Note that in various embodiments, a depletion operation may be applied to the pixels of a canvas (e.g., to simulate the scraping away of paint from the canvas), to the pixels of a brush (e.g., to simulate the wiping away of paint from a brush), or to any pixels for which color, alpha, and fill channel values are maintained, and the methods described herein may be used to calculate new opacity and/or fill values as a result of such an operation.

In some embodiments, the system described herein may store the actual fill channel value at a given pixel for subsequent use, even though the fill channel value may be greater than 1, e.g., when the calculation of a new fill channel value following a compositing operation results in a fill channel value greater than 1. In some embodiments, this may result in more realistic looking results for various image editing operations. In one example, many, many layers of paint that is 50% opaque may be deposited in the same area, resulting in a fill channel value of 10 for the affected pixels. If a subsequent editing operation removes some of the paint from these pixels (e.g., one or several layers of paint), the user may prefer the result to reflect the fact that there is still a lot of paint in that area (e.g. all of the other layers of paint that were not removed). In some embodiments, the system may be configured to store the full range of the fill channel values, as arbitrarily high as they can go. In such embodiments, the system may store the full fill channel value of 10 (units) rather than a clamped fill channel value. In this example, if 1 unit of paint is removed (e.g., using an eraser or scraping tool of the image editing application), the full effect of the remaining paint may be maintained, because the fill channel value (now reduced to 9 by the removal of some paint) is still greater than 1. On the other hand, if the system had only stored a fill channel value that is clamped to a value of 1, and a subsequent operation removed some of the paint (again, 1 unit), the resulting fill channel value would be 0. Thus, it would appear that there was no more paint stored in this area, even though many layers of paint had been deposited and only a portion of it had been removed.

In some embodiments, the following equations may be used to update the opacity and fill channel values at a given pixel when depleting the amount of paint at the pixel (i.e. when depleting the paint at a source pixel S by an amount specified by the opacity and fill channel values of D):

$$D'_c = S_c \quad (13)$$

$$D'_a = \frac{S_f S_a - D_f D_a}{S_f - D_f} \quad (14)$$

$$D'_f = S_f - D_f \quad (15)$$

Figure 11:
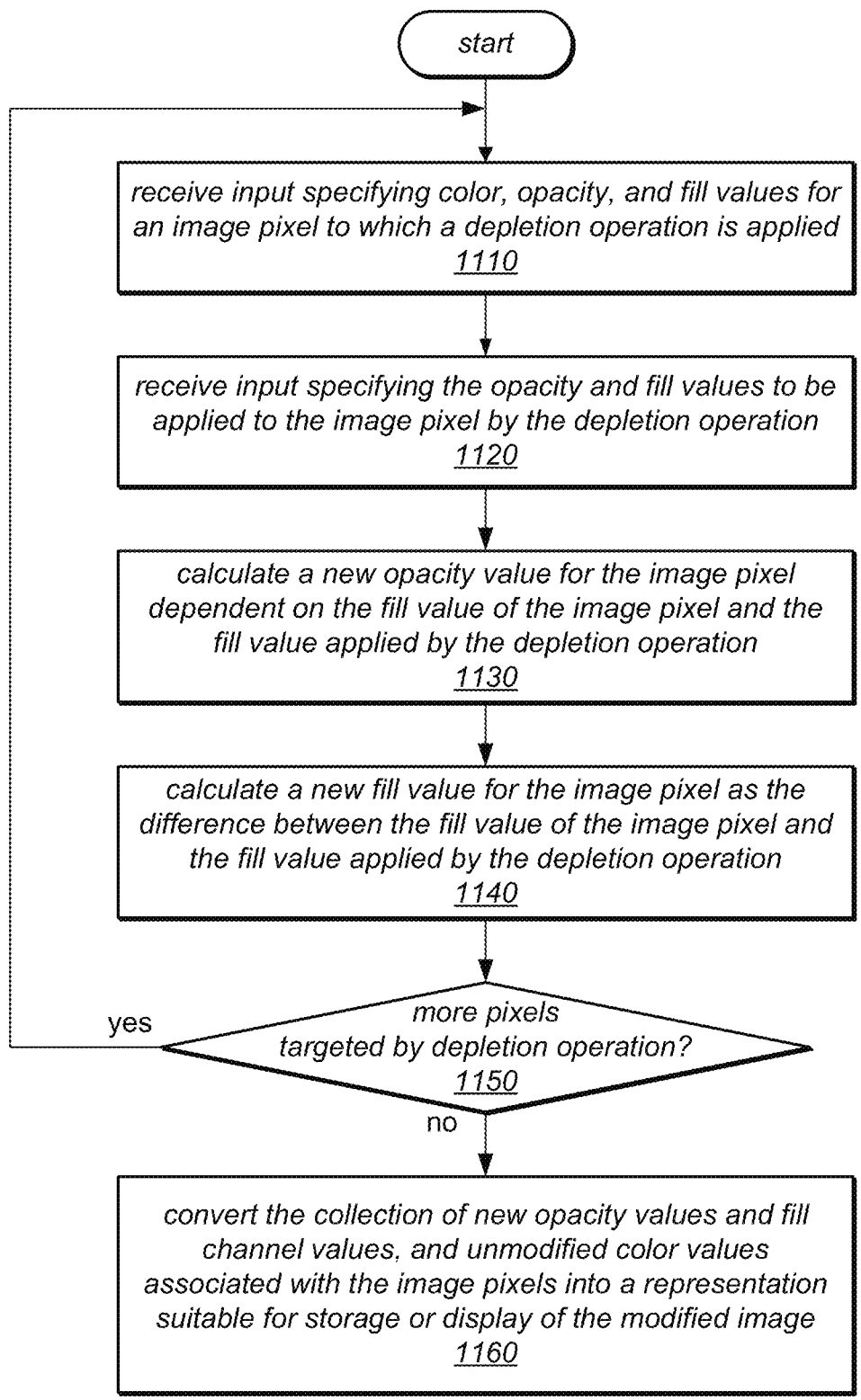
FIG. 11 is a flow diagram illustrating a method for performing a paint depletion operation using a color space representation that includes a fill channel, according to one embodiment.

FIG. 11 illustrates a method for depleting the paint at a given pixel (e.g., using an erasing or scraping tool of an image editing application) in a system that employs a color space representation that includes a fill channel, according to one embodiment. As illustrated in this example, the method may include receiving input specifying color, opacity, and fill channel values for an image pixel to which a depletion operation is applied, as in 1110. The method may also include receiving input specifying the opacity and fill channel values to be applied to the image pixel by the depletion operation, as in 1120. As noted above, these inputs may be received from a variety of sources, including, but not limited to, a physical brush simulation or fluid simulation, a pattern stamping operation, a user input mechanism (e.g., an input mechanism that allows a user to specify an opacity and/or fill channel value for a scraping tool), a previously performed image editing operation, or image data accessed from an image file or other document stored in memory, in different embodiments.

As illustrated at 1130 in FIG. 11, the method may include calculating a new opacity value for the image pixel, dependent on the fill channel value of the image pixel and the fill channel value applied by the depletion operation. For example, in some embodiments calculating the new opacity value for the image pixel may be performed in accordance with equation 14 above. As seen in this equation, the resulting opacity value is dependent on the source and destination fill channel values. Note that, as described above and illustrated in equation 13, the color channel value associated with the image pixel may not change as a result of the depletion operation. As illustrated in this example, the method may include calculating a new fill channel value for the image pixel as the difference between the fill channel value of the image pixel and the fill channel value applied by the depletion operation (as in 1140). In other words, in a depletion operation, the fill channel value associated with a targeted pixel may in some embodiments be reduced by an amount explicitly specified for the depletion operation using, for example, a calculation similar to that shown in equation 15 above.

If there are more pixels involved in the depletion operation, shown as the positive exit from 1150, the method may include repeating the operations illustrated in 1110-1140 for these additional pixels. If not, shown as the negative exit from 1150, the method may include converting the collection of the new opacity and fill channel values and the unmodified color channel values associated with the affected images pixels into a representation that is suitable for storage (e.g., within the image editing application, or within an image file or other document) and/or for display of the modified image (e.g., on a display monitor, or as a printed image), as in 1160. In some embodiments, such a conversion may be performed in accordance with equations 5 and 6 above. Again, note that in some embodiments, the image editing application may store pixel data for the canvas and/or brushes in multiple buffers, each employing a different color space representation (e.g., one that stores fill channel values, and one to be used for display that has been converted to a color space representation that does not include fill channel values).

In some embodiments, the system and methods described herein may be used to apply textures to an image, and to apply compositing, mixing, and/or depletion operations on textures deposited on a canvas. For example, an image editing application may allow a user to "paint" using a texture or pattern specified by an atomic texture element (texel), in addition to allowing the user to paint with color. In some embodiments, data defining each texel may include color channel values, opacity values, and/or fill channel values for each pixel of the texel. For example, different portions of the pattern could have different colors and/or different transparency properties, and may store different amounts of paint (e.g., different thicknesses of paint). In one embodiment, a fundamental element of a texture (i.e. a texel) may be represented as a small rectangle of RGBA pixels to which an F channel is added to represent the amount of paint at each pixel of the texel. In such embodiments, if the texture is applied to a blank portion of an image using a pattern brush tool of the image editing application, the tool would not only deposit the color(s) defined by the textures, but would also deposit an amount of paint (i.e. a fill channel value) in the fill channels for each of the pixels. If the texture were applied over previously deposited paint or an existing texture, the methods described herein for compositing and/or mixing paints at each pixel affected by the operation may be employed to calculate the color, opacity and/or fill channel values of the affected pixels as a result of the operation. Similarly, if an eraser or scraping tool of the image editing application were applied to a texture, the methods described herein for a depletion operation may be applied to the targeted pixels to determine the effects of the operation.

In some embodiments, a fill channel, such as that described herein, may be used in an image editing application in rendering the height field of the canvas data (pixels), e.g., if the image editing application supports the simulation of 3D effects in 2D images. In such embodiments, if a pattern stored the fill channel values, this may be thought of as storing a surface texture of the paint, which may then be used for lighting, bump mapping, or other image enhancement operations that simulate 3D effects. As noted above, each of the tiles of the texture (i.e. the texels) may include different fill channel values for each of the pixels of the texe, to give it a shape (e.g., reflecting that there is more paint in the middle of the texel, or on the edge of the texel). In other words, in some embodiments, fill channel values may vary across the pixels of an individual texel, as well as across an image in which many instances of the texel have been applied.

Figure 12A:
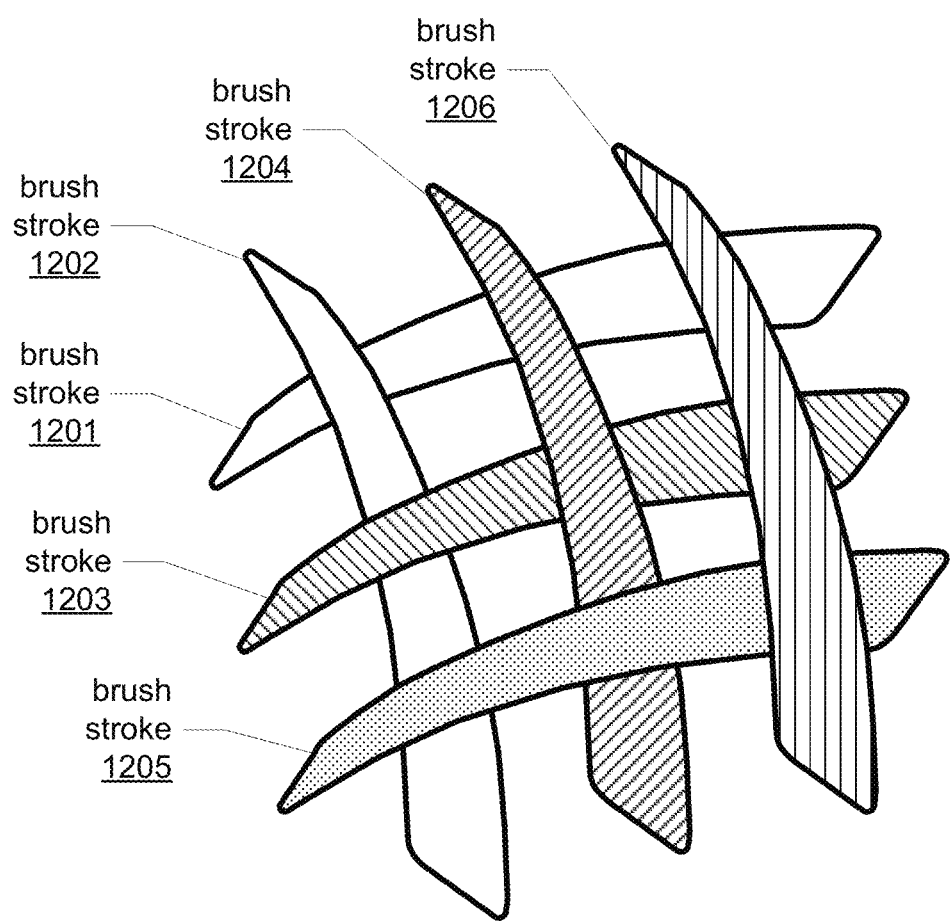
FIGS. 12A-12E illustrate the application of the methods described herein for compositing, mixing, and depleting paints in an image editing application using a color space representation that includes a fill channel, according to one embodiment.

FIGS. 12A-12D illustrate the application of the methods described herein for compositing, mixing, and depleting paints in an image editing application using a color space representation that includes a fill channel, according to one embodiment. In each of these figures, brush strokes of different colors are depicted using different fill patterns. For example, FIG. 12A illustrates a compositing operation involving six brush strokes of four different colors painted on an otherwise blank canvas. In this example, each brush stroke is allowed to "dry" before the next brush stroke is applied in the image editing application. In this example, brush stroke 1201 is the first to be applied to the canvas. The second brush stroke to be applied to the canvas is brush stroke 1202. Since brush stroke 1201 was dry before brush stroke 1202 was applied, the final color, opacity, and fill channel values associated with the pixels in the portion of the image in which these two brush strokes overlap may be calculated using the compositing equations described above (i.e. equations 7-9). Note that brush stroke 1202 applies paint of the same color as that applied by brush stroke 1201. Therefore, the color value for the pixels in the area of overlap between the two brush strokes will be the same as the color of the paint deposited by both of them.

In this example, the next brush stroke to be applied is brush stroke 1203, which deposits paint of a different color than brush strokes 1201 and 1202. As illustrated in FIG. 12A, the paint deposited by brush stroke 1203 is composited over a portion of brush stroke 1202, obscuring the paint deposited by brush stroke 1202. Again, equations 7-9 may be used to calculate the color, opacity, and fill channel values for the pixels in the overlap area, in this example. In the example illustrated in FIG. 12A, the remaining brush strokes are applied in the following order and each is composited over the (dry) paint deposited by previous brush strokes where there is overlap between the brush strokes: 1204, 1205, and 1206. As each successive brush stroke is applied to the canvas, the color, opacity, and fill channel values may be calculated for pixels in any overlapping areas using equations 7-9.

Figure 12B:
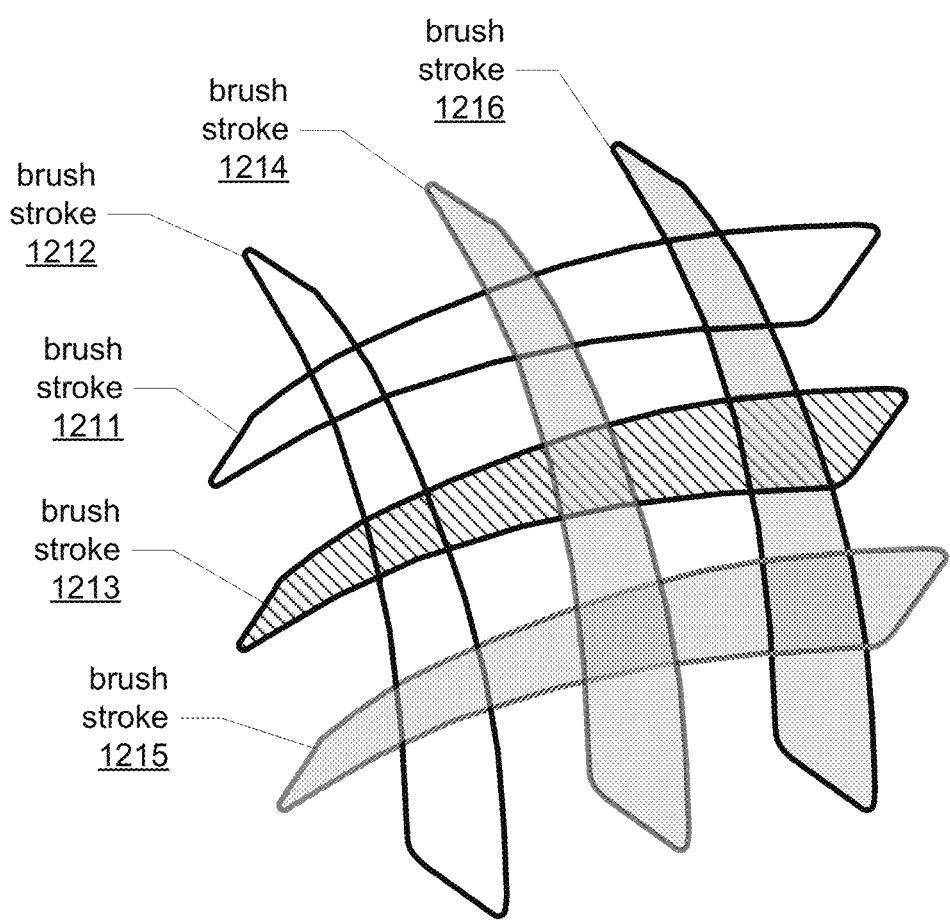

FIG. 12B illustrates a paint mixing operation involving six brush strokes of four different colors painted on an otherwise blank canvas. In this example, each brush stroke is applied while the paint from any previous brush strokes is still wet, allowing mixing of the paints in any overlapping areas. In this example, brush stroke 1211 is the first to be applied to the canvas. The second brush stroke to be applied to the canvas is brush stroke 1212. Since brush stroke 1211 was still wet when brush stroke 1212 was applied, the final color, opacity, and fill channel values associated with the pixels in the portion of the image in which these two brush strokes overlap may be calculated using the mixing equations described above (i.e. equations 10-12). Note that brush stroke 1212 applies paint of the same color as that applied by brush stroke 1211. Therefore, the color value for the pixels in the area of overlap between the two brush strokes will be the same as the color of the paint deposited by both of them.

In this example, the next brush stroke to be applied is brush stroke 1213, which deposits paint of a different color than brush strokes 1211 and 1212. As illustrated in FIG. 12B, the paint deposited by brush stroke 1213 is mixed with paint deposited by brush stroke 1212 in the overlapping area. Again, equations 10-12 may be used to calculate the color, opacity, and fill channel values for the pixels in the overlap area, in this example. In the example illustrated in FIG. 12B, the remaining brush strokes are applied in the following order and each is mixed with the (wet) paint deposited by previous brush strokes where there is overlap between the brush strokes: 1214, 1215, and 1216. As each successive brush stroke is applied to the canvas, the color, opacity, and fill channel values may be calculated for pixels in any overlapping areas using equations 10-12.

Figure 12C:
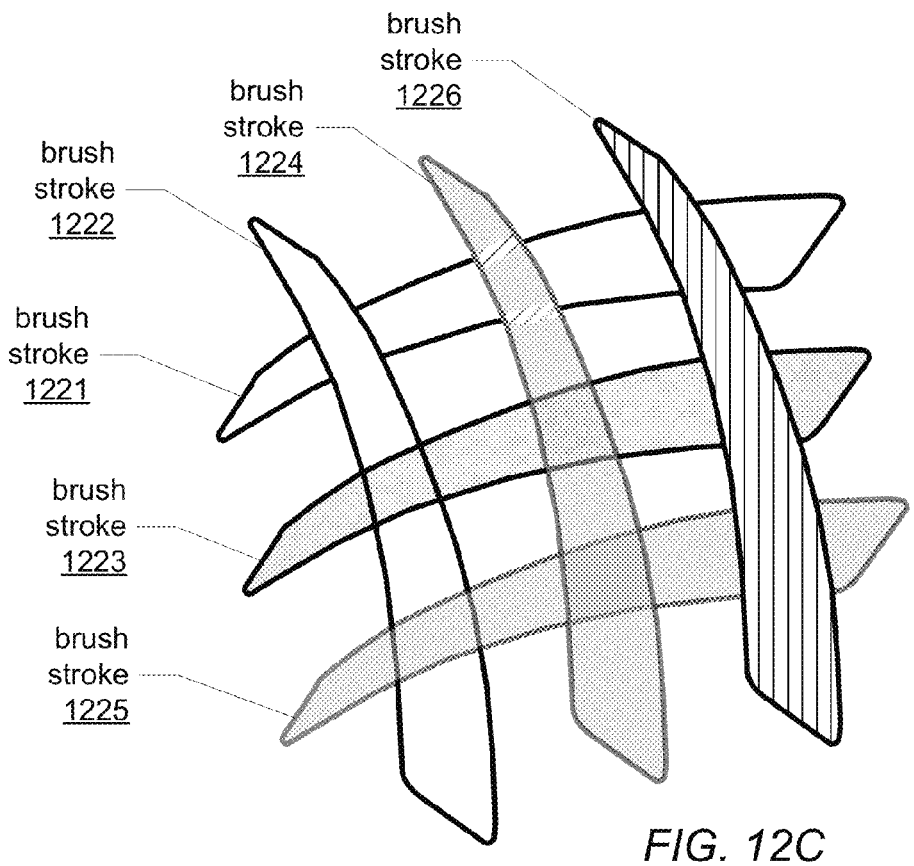

FIG. 12C illustrates a collection of paint compositing and paint mixing operations involving six brush strokes of four different colors painted on an otherwise blank canvas. In this example, some brush strokes are applied while the paint from previous brush strokes is still wet (allowing mixing of the paints in any overlapping areas), while other brush strokes are applied after the previous brush strokes have been allowed to dry. In this example, brush stroke 1221 is the first to be applied to the canvas. The second brush stroke to be applied to the canvas is brush stroke 1222. In this example, brush stroke 1221 was allowed to dry before brush stroke 1202 was applied. Therefore, the final color, opacity, and fill channel values associated with the pixels in the portion of the image in which these two brush strokes overlap may be calculated using the compositing equations described above (i.e. equations 7-9). Note that brush stroke 1222 applies paint of the same color as that applied by brush stroke 1221. Therefore, the color value for the pixels in the area of overlap between these two brush strokes will be the same as the color of the paint deposited by both of them.

In this example, the next brush stroke to be applied is brush stroke 1223, which deposits paint of a different color than brush strokes 1221 and 1222. In this case, brush stroke 1223 is applied while the paint deposited by brush stroke 1222 is still wet. Therefore, as illustrated in FIG. 12C, the paint deposited by brush stroke 1223 is mixed with paint deposited by brush stroke 1222 in the area of overlap between these two brush strokes. In this example, the mixing equations described above (i.e. equations 10-12) may be used to calculate the color, opacity, and fill channel values for the pixels in this overlap area. In the example illustrated in FIG. 12C, the next brush stroke to be applied is brush stroke 1224, which is applied while the paint deposited by brush stroke 1223 is still wet. Therefore, equations 10-12 may also be used to calculate the color, opacity, and fill channel values for the pixels in the area of overlap between brush strokes 1223 and 1224. On the other hand, since the paint deposited by brush stroke 1221 was already dry, equations 7-9 (the compositing equations described above) may be used to calculate the color, opacity, and fill channel values for the pixels in the area of overlap between brush strokes 1221 and 1224, in this example.

In the example illustrated in FIG. 12C, the next brush stroke to be applied is brush stroke 1225, which is applied while the paint deposited by brush strokes 1222 and 1224 are still wet. Therefore, equations 10-12 may also be used to calculate the color, opacity, and fill channel values for the pixels in the area of overlap between brush strokes 1224 and 1225, and for the pixels in the area of overlap between brush strokes 1222 and 1225. Finally, brush stroke 1226 may be applied after the paint deposited by brush strokes 1221-1225 have been allowed to dry. Therefore, the compositing equations described above (i.e. equations 7-9) may be used to calculate the color, opacity, and fill channel values for the pixels in the area of overlap between brush strokes 1226 and 1221, for the pixels in the area of overlap between brush strokes 1226 and 1223, and for the pixels in the area of overlap between brush strokes 1226 and 1225, since the paint deposited by brush stroke 1226 is composited over the paint deposited by these previous brush strokes, at least partially obscuring them.

Figure 12D:
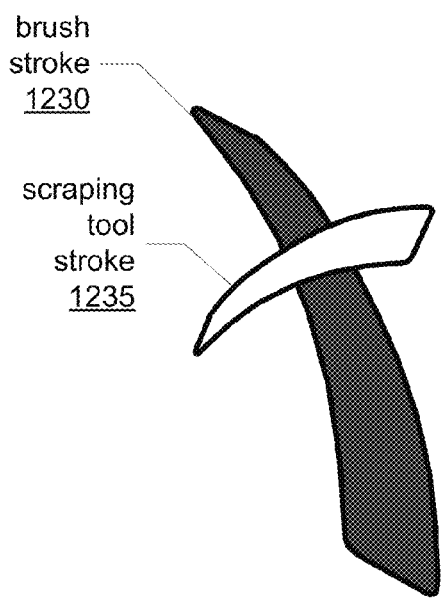
Figure 12E:
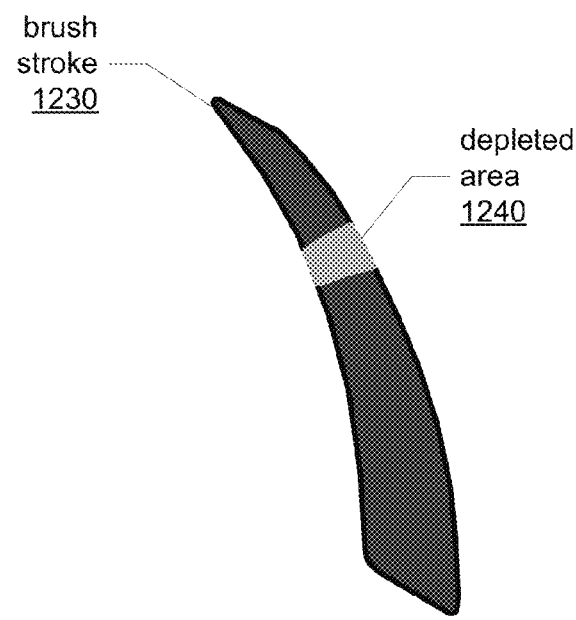
Figure 13:
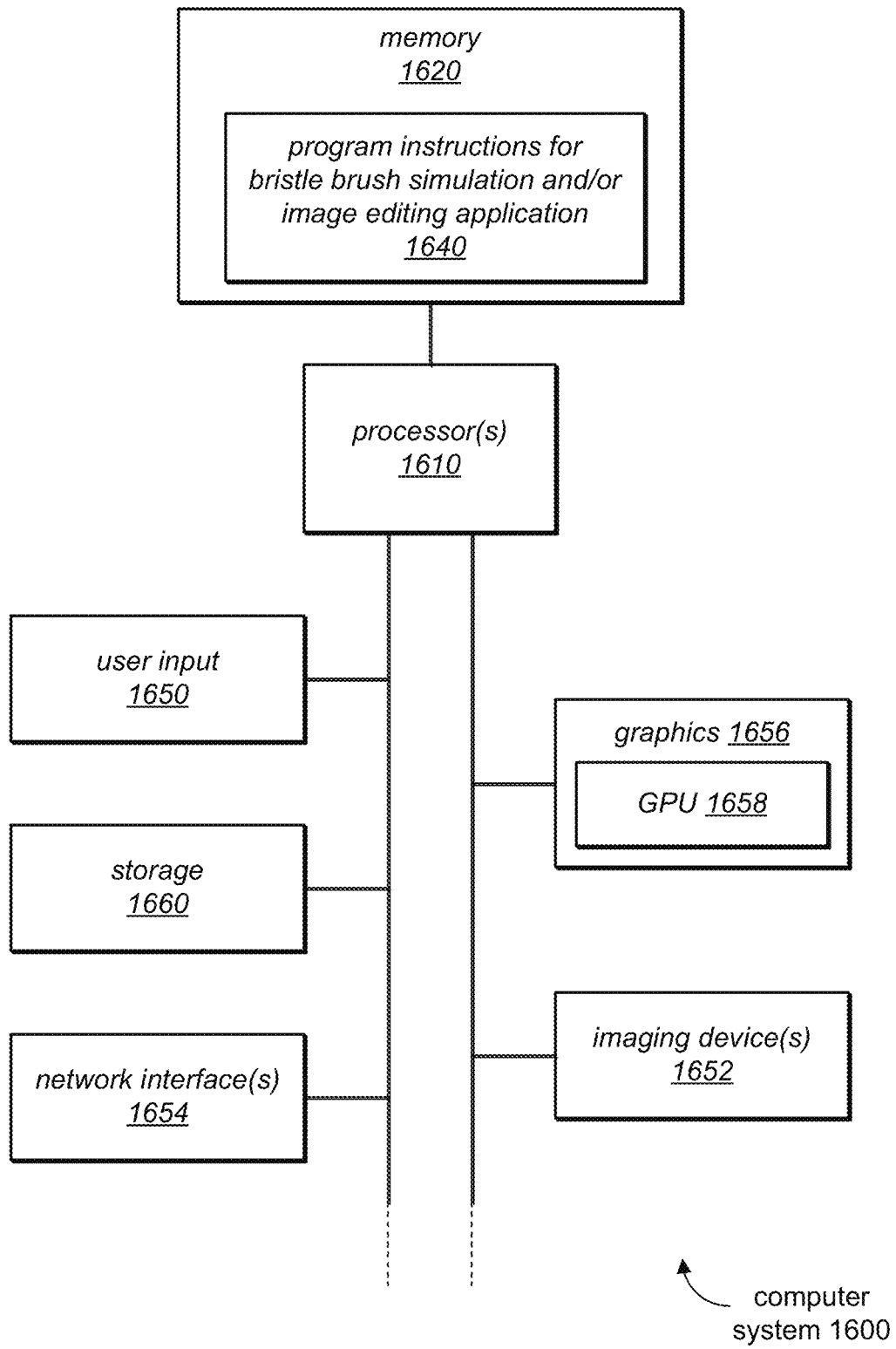
FIG. 13 is a block diagram illustrating constituent elements of a computer system that is configured to implement brush simulation and image editing operations using a color space representation that includes a fill channel, according to various embodiments.

FIGS. 12D and 12E illustrate a paint depletion operation (such as with an erasing or scraping tool) in an image editing application using a color space representation that includes a fill channel, according to one embodiment. In this example, FIG. 12D illustrates a scraping tool stroke 1235 crossing the paint previously deposited by a brush stroke 1230. FIG. 12E illustrates the effect of the depletion operation on the area of overlap between brush stroke 1230 and scarping tool stroke 1235. As described herein, the scraping tool stroke may apply particular opacity and fill channel values (e.g., as values of a configurable tool parameter specified by a user, or default values defined within the application) to the depletion operation. Therefore, the opacity and fill channel values for the pixels in the portion of the image in which the scraping tool stroke crosses the paint deposited by brush stroke 1230 (i.e. depleted area 1240) may be calculated using the depletion equations described above (i.e. equations 14 and 15). Note that in these equations, the color, opacity and fill channel values resulting from brush stroke 1230 are considered the color, opacity and fill channel values of the source pixel, and the opacity and fill channel values applied by the depletion operation are considered the opacity and fill channel values of the destination pixel. Note also that, according to equation 13 (and as illustrated in FIG. 12E), the color value for pixels targeted by a depletion operation does not change as a result of the depletion operation, even though the opacity and/or fill channel values may change.

In some embodiments, performance of the brush model, brush simulations, and/or image editing operations described herein may be improved by integrating GPU acceleration for the rasterization, compositing, mixing, and/or depletion operations described. This may result in an additional leap in performance, especially when employing models of large brushes (e.g., those having a large footprint and/or a large number of bristles). In some embodiments, the addition of a fill channel value in the data associated with each pixel may require an additional variable for each pixel, or may require that a variable (or data structure representation thereof) that stores color values and alpha channel values be replaced by a variable or data structure that can also store this additional value. In other embodiments, two sets of data may be maintained for each pixel of an image or brush model: one that includes an additional fill channel (for use in producing realistic results from compositing, mixing, and depletion operations, as described herein), and one that does not include a fill channel.

The methods described herein for bristle brush simulation and/or image editing operations using a color space representation that includes a fill channel may be performed by a computer system configured to provide the functionality described. FIG. 16 is a block diagram illustrating one embodiment of a computer system 1600 configured to implement such image editing operations (e.g., within an image editing application or any of a variety of graphics applications that provide such image editing functionality, such as painting, publishing, photography, games, animation, and other applications). Computer system 1600 may be any of various types of devices, including, but not limited to, a personal computer system, desktop computer, laptop or notebook computer, mainframe computer system, handheld computer, workstation, network computer, a consumer device, video game console, handheld video game device, application server, storage device, a peripheral device such as a switch, modem, router, or in general any type of computing device.

The computer system 1600 may include one or more processors 1610 implemented using any desired architecture or chip set, such as the SPARC™ architecture, an x86-compatible architecture from Intel Corporation or Advanced Micro Devices, or an other architecture or chipset capable of processing data. Any desired operating system(s) may be run on the computer system 1600, such as various versions of Unix, Linux, Windows® from Microsoft Corporation, MacOS® from Apple Inc., or any other operating system that enables the operation of software on a hardware platform. The processor(s) 1610 may be coupled to one or more of the other illustrated components, such as a memory 1620, by at least one communications bus.

In one embodiment, program instructions 1640 may be executable by the processor(s) 1610 to implement aspects of the techniques described herein (e.g., program instructions executable to cause computer system 1600 to perform bristle brush simulation and/or other image editing operations using a color space representation that includes a fill channel). For example, program instruction 1640 may include program instructions executable to implement a graphics application that may be configured to perform various image editing functions and to render new images accordingly. In some embodiments, a user may invoke operations to add, move or remove objects, resize objects or entire images, create, remove, or modify colors, texture-maps and/or textures of objects in an image, or otherwise alter an input image through a user interface of a graphics application, and this user interface may include one or more brush tools, eraser tools, and/or scraping tools, as described herein. In some embodiments, program instructions 1640 may be configured to perform these operations and may employ the methods described herein for performing bristle brush simulation and/or other image editing operations using a color space representation that includes a fill channel. Program instructions 1640 may be configured to render output images (i.e. images modified by various image editing operations) to a separate window, or directly into the same frame buffer containing the input image, in different embodiments.

In various embodiments, program instructions 1640 may be partly or fully resident within the memory 1620 at the computer system 1600 at any point in time. For example, portions of the digital image editing program 100 and its constituent elements and data (e.g., editing operations 120, brush model 130, and/or brush behavior simulation functionality 140) and/or program instructions executable to perform bristle brush simulation and/or other image editing operations using a color space representation that includes a fill channel may be stored in the memory 1620. The memory 1620 may be implemented using any appropriate medium such as any of various types of ROM or RAM (e.g., DRAM, SDRAM, RDRAM, SRAM, etc.), or combinations thereof. The program instructions may also be stored on a storage device 1660 accessible from the processor(s) 1610. Any of a variety of storage devices 1660 may be used to store the program instructions 1640 in different embodiments, including any desired type of persistent and/or volatile storage devices, such as individual disks, disk arrays, optical devices (e.g., CD-ROMs, CD-RW drives, DVD-ROMs, DVD-RW drives), flash memory devices, various types of RAM, holographic storage, etc. The storage 1660 may be coupled to the processor(s) 1610 through one or more storage or I/O interfaces. In some embodiments, the program instructions 1640 may be provided to the computer system 1600 via any suitable computer-readable storage medium including the memory 1620 and storage devices 1660 described above.

In one embodiment, a specialized graphics card or other graphics component 1656 may be coupled to the processor(s) 1610. The graphics component 1656 may include a graphics processing unit (GPU) 1658. A GPU may be considered a dedicated graphics-rendering device for a personal computer, workstation, game console or other computer system. Modern GPUs may be very efficient at manipulating and displaying computer graphics and their highly parallel structure may make them more effective than typical CPUs for a range of complex graphical algorithms. In some embodiments, program instructions 1640 may utilize GPU 1658 when rendering or displaying images, and/or to accelerate other operations that are suitable for parallel processing, according to various embodiments. For example, GPU 1658 may implement a number of graphics primitive operations in a way that makes executing them much faster than drawing directly to the screen with CPU 1610. In other embodiments, the methods disclosed herein for simulating brush behavior, and/or for compositing, mixing, or depletion operations may be implemented by program instructions configured for parallel execution on one or more such GPUs. The GPU 1658 may implement one or more application programmer interfaces (APIs) that permit programmers to invoke the functionality of the GPU. Suitable GPUs may be commercially available from vendors such as NVIDIA Corporation, ATI Technologies, and others. In some embodiments, at least a portion of program instructions 1640 may be provided to GPU 1658 for performing image editing operations (or portions thereof) on GPU 1658 using one or more of the techniques described herein. In some embodiments, the techniques described herein may be implemented by a combination of program instructions 1640 executed on one or more processors 1610 and one or more GPUs 1658, respectively. Program instructions 1640 may also be stored on an external storage device (such as storage 1660) accessible by the processor(s) 1610 and/or GPU 1658, in some embodiments.

In some embodiments, computer system 1600 may include one or more imaging devices 1652. The one or more imaging devices 1652 may include various types of raster-based imaging devices such as monitors and printers. In one embodiment, one or more display devices 1652 may be coupled to the graphics component 1656 for display of data provided by the graphics component 1656. The computer system 1600 may also include one or more additional I/O interfaces, such as interfaces for one or more user input devices 1650. In addition, the computer system 1600 may include one or more network interfaces 1654 providing access to a network. It should be noted that one or more components of the computer system 1600 may be located remotely and accessed via the network. The program instructions 1640 may be implemented in various embodiments using any desired programming language, scripting language, or combination of programming languages and/or scripting languages, e.g., C, C++, C#, Java™, Perl, etc. The computer system 1600 may also include numerous elements not shown in FIG. 16, as illustrated by the ellipsis.

In various embodiments, the elements shown in various flow diagrams (e.g., FIGS. 6, 7, 9, 10, and 11) may be performed in a different order than the illustrated order. In these figures, any of the operations described in the elements may be performed programmatically (i.e., by a computer according to a computer program). In these figures, any of the operations described in the elements may be performed automatically (i.e., without user intervention).

Although the embodiments above have been described in detail, numerous variations and modifications will become apparent to those skilled in the art once the above disclosure is fully appreciated. It is intended that the following claims be interpreted to embrace all such variations and modifications.

What is claimed is:

1. A method, comprising:
   executing an image editing application on a processor of a computer to perform:
   storing, in a data structure, a fill channel value that represents an amount of paint stored per pixel on a brush tool, the data structure configured to store one or more color channel values, an opacity channel value, and the fill channel value for a given color space;
   storing the one or more color channel values that represent at least one color of a source pixel of the brush tool;
   storing the opacity channel value for the source pixel;
   receiving an input of an image editing operation to apply the paint from the source pixel to a destination pixel;
   calculating a consequent color of the destination pixel based on the fill channel value of the source pixel as a result of the image editing operation; and
   displaying the consequent color of the destination pixel.

2. The method of claim 1, wherein the brush tool is used to apply the image editing operation.

3. The method of claim 1, wherein the destination pixel represents a pixel of a canvas to which the image editing operation is applied.

4. The method of claim 1, wherein said calculating the consequent color of the destination pixel comprises calculating one or more resultant color channel values, a resultant opacity channel value, and a resultant fill channel value for the destination pixel.

5. The method of claim 4, wherein:
   said calculating the consequent color further comprises converting the one or more resultant color channel values, the resultant opacity channel value, and the resultant fill channel value for the destination pixel to one or more other color channel values representing the destination pixel in a color space that does not include an opacity channel value and that does not include a fill channel value; and
   said converting is dependent on the resultant opacity channel value and the resultant fill channel value.

6. The method of claim 1, wherein said calculating the consequent color of the destination pixel comprises:
   calculating a new opacity channel value and a new fill channel value for the destination pixel in the given color space; and
   maintaining the previous color channel values for the destination pixel in the given color space.

7. The method of claim 1, wherein said calculating the consequent color of the destination pixel comprises clamping the fill channel value to a maximum value of one during said calculating.

8. The method of claim 1, wherein the image editing operation comprises a paint compositing operation, a paint mixing operation, or a paint depletion operation at the destination pixel.

9. The method of claim 1, wherein the source pixel is a pixel of an atomic element of a texture to be applied by the image editing operation.

10. A computer-readable storage memory comprising stored program instructions that are executable by one or more processors to perform:
    storing, in a data structure, a fill channel value that represents an amount of paint stored per pixel on a brush tool, the data structure configured to store one or more color channel values, an opacity channel value, and the fill channel value for a given color space;
    storing the one or more color channel values that represent at least one color of a source pixel of the brush tool;
    storing the opacity channel value for the source pixel;
    receiving an input of an image editing operation to apply the paint from the source pixel to a destination pixel;
    calculating a consequent color of the destination pixel based on the fill channel value of the source pixel as a result of the image editing operation; and
    displaying the consequent color of the destination pixel.

11. The computer-readable storage memory of claim 10, wherein the brush tool is used to apply the image editing operation.

12. The computer-readable storage memory of claim 10, wherein the destination pixel represents a pixel of a canvas to which the image editing operation is applied.

13. The computer-readable storage memory of claim 10, wherein said calculating the consequent color of the destination pixel comprises calculating one or more resultant color channel values, a resultant opacity channel value, and a resultant fill channel value for the destination pixel.

14. The computer-readable storage memory of claim 13, wherein:
    said calculating the consequent color further comprises converting the one or more resultant color channel values, the resultant opacity channel value, and the resultant fill channel value for the destination pixel to one or more other color channel values representing the destination pixel in a color space that does not include an opacity channel value and that does not include a fill channel value; and
    said converting is dependent on the resultant opacity channel value and the resultant opacity channel value.

15. The computer-readable storage memory of claim 10, wherein said calculating the consequent color of the destination pixel comprises:

calculating a new opacity channel value and a new fill channel value for the destination pixel in the given color space; and maintaining the previous color channel values for the destination pixel in the given color space.

16. A system, comprising:

a memory comprising a data structure configured to store one or more color channel values, an opacity channel value, and a fill channel value for a given color space;

one or more processors to execute an image editing application that is configured to:
- store, in the data structure, the fill channel value that represents an amount of paint stored per pixel on a brush tool;
- store the one or more color channel values that represent at least one color of a source pixel of the brush tool;
- store the opacity channel value for the source pixel;
- receive an input of an image editing operation to apply the paint from the source pixel to a destination pixel;
- calculate a consequent color of the destination pixel based on the fill channel value of the source pixel as a result of the image editing operation; and
- display the consequent color of the destination pixel.

17. The system of claim 16, wherein the brush tool is used to apply the image editing operation.

18. The system of claim 16, wherein the destination pixel represents a pixel of a canvas to which the image editing operation is applied.

19. The system of claim 16, wherein the image editing application is configured to calculate the consequent color of the destination pixel by calculating one or more resultant color channel values, a resultant opacity channel value, and a resultant fill channel value for the destination pixel.

20. The system of claim 19, wherein the image editing application is configured to:
- calculate the consequent color by converting the one or more resultant color channel values, the resultant opacity channel value, and the resultant fill channel value for the destination pixel to one or more other color channel values representing the destination pixel in a color space that does not include an opacity channel value and that does not include a fill channel value; and
- wherein said converting is dependent on the resultant opacity channel value and the resultant opacity channel value.

* * * * *